(12) United States Patent
D'Souza et al.

(10) Patent No.: US 8,161,318 B2
(45) Date of Patent: *Apr. 17, 2012

(54) ENTERPRISE SERVICE AVAILABILITY THROUGH IDENTITY PRESERVATION

(75) Inventors: Roy P. D'Souza, Santa Clara, CA (US); Thirumalai Muppur Ravi, Santa Clara, CA (US)

(73) Assignee: Mimosa Systems, Inc., Santa Clara, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 11/500,809

(22) Filed: Aug. 7, 2006

(65) Prior Publication Data

US 2007/0143374 A1 Jun. 21, 2007

Related U.S. Application Data

(63) Continuation-in-part of application No. 11/211,056, filed on Aug. 23, 2005, now Pat. No. 7,778,976.

(60) Provisional application No. 60/650,556, filed on Feb. 7, 2005.

(51) Int. Cl.
*G06F 11/00* (2006.01)

(52) U.S. Cl. .......................................................... 714/6

(58) Field of Classification Search ........................ 714/6
See application file for complete search history.

(56) References Cited

U.S. PATENT DOCUMENTS

| | | | |
|---|---|---|---|
| 5,689,698 A * | 11/1997 | Jones et al. ............................. | 1/1 |
| 5,721,916 A * | 2/1998 | Pardikar ................................. | 1/1 |
| 5,974,563 A * | 10/1999 | Beeler, Jr. ..................... | 714/5.11 |
| 6,094,654 A * | 7/2000 | Van Huben et al. ................... | 1/1 |
| 6,148,410 A * | 11/2000 | Baskey et al. ................. | 714/4.11 |
| 6,226,651 B1 * | 5/2001 | Masuda et al. ......................... | 1/1 |
| 6,240,414 B1 * | 5/2001 | Beizer et al. ........................... | 1/1 |
| 6,249,879 B1 * | 6/2001 | Walker et al. .................... | 714/11 |
| 6,253,230 B1 * | 6/2001 | Couland et al. ............... | 709/203 |
| 6,256,773 B1 * | 7/2001 | Bowman-Amuah .......... | 717/121 |
| 6,260,129 B1 * | 7/2001 | Crockett et al. ............. | 711/170 |
| 6,434,568 B1 | 8/2002 | Bowman-Amuah | |
| 6,477,580 B1 * | 11/2002 | Bowman-Amuah .......... | 709/231 |
| 6,516,337 B1 * | 2/2003 | Tripp et al. .................... | 709/202 |
| 6,523,027 B1 | 2/2003 | Underwood | |
| 6,564,215 B1 | 5/2003 | Hsiao et al. | |

(Continued)

OTHER PUBLICATIONS

Form PCT/ISA/220, PCT/US06/02405, "PCT Notification of Transmittal of The International Search Report and the Written Opinion of the International Searching Authority, or the Declaration," 1 pg.

(Continued)

*Primary Examiner* — Amine Riad
(74) *Attorney, Agent, or Firm* — Gregory & Sawrie LLP

(57) ABSTRACT

Systems and methods are described for service availability that provides automated recovery of server service in a timely and application intelligent manner, maintaining application consistency and integrity, while preserving server identity. The systems and methods, referred to herein as a Service Preservation System (SPS), manage complete recovery of server data and preserve continuity of server service, reestablishing user access to server(s) after an event or disaster in which in which primary or other server(s) fail. The failures, disasters, and losses referred to herein can be at many levels and include, but are not limited to, accidental deletion of an item, loss of an entire mailbox, loss of an entire disk drive, loss of an entire server, and/or loss of an entire server site.

47 Claims, 21 Drawing Sheets

U.S. PATENT DOCUMENTS

| | | | |
|---|---|---|---|
| 6,587,933 | B2 | 7/2003 | Crockett et al. |
| 6,668,253 | B1 | 12/2003 | Thompson et al. |
| 6,675,205 | B2 | 1/2004 | Meadway et al. |
| 6,718,361 | B1 | 4/2004 | Basani et al. |
| 6,766,326 | B1 | 7/2004 | Cena |
| 7,100,195 | B1 | 8/2006 | Underwood |
| 7,177,886 | B2 | 2/2007 | Pruet, III |
| 7,212,726 | B2 | 5/2007 | Zetts |
| 7,426,652 | B2 | 9/2008 | Liccione et al. |
| 7,512,835 | B2 * | 3/2009 | Bartfai et al. ............... 714/6 |
| 7,523,348 | B2 * | 4/2009 | Anand et al. ............... 714/16 |
| 2002/0029207 | A1 | 3/2002 | Bakalash et al. |
| 2002/0129096 | A1 | 9/2002 | Mansour et al. |
| 2002/0163910 | A1 | 11/2002 | Wisner et al. |
| 2003/0005350 | A1 | 1/2003 | Koning et al. |
| 2003/0009295 | A1 | 1/2003 | Markowitz et al. |
| 2003/0058277 | A1 | 3/2003 | Bowman-Amuah |
| 2003/0120458 | A1 | 6/2003 | Rao |
| 2003/0135499 | A1 | 7/2003 | Schirmer et al. |
| 2003/0159083 | A1 | 8/2003 | Fukuhara et al. |
| 2003/0200272 | A1 | 10/2003 | Campise et al. |
| 2003/0229900 | A1 | 12/2003 | Reisman |
| 2003/0233518 | A1 | 12/2003 | Yamagami et al. |
| 2004/0025076 | A1 * | 2/2004 | Cabrera et al. ............... 714/2 |
| 2004/0031058 | A1 | 2/2004 | Reisman |
| 2004/0034808 | A1 * | 2/2004 | Day et al. ............... 714/6 |
| 2004/0158766 | A1 | 8/2004 | Liccione et al. |
| 2004/0215656 | A1 | 10/2004 | Dill et al. |
| 2004/0268175 | A1 | 12/2004 | Koch et al. |
| 2005/0010550 | A1 | 1/2005 | Potter et al. |
| 2005/0015466 | A1 | 1/2005 | Tripp |
| 2005/0044197 | A1 | 2/2005 | Lai |
| 2005/0228937 | A1 | 10/2005 | Karr et al. |
| 2005/0246345 | A1 | 11/2005 | Lent et al. |
| 2005/0268145 | A1 | 12/2005 | Hufferd et al. |
| 2006/0218210 | A1 | 9/2006 | Sarna et al. |
| 2007/0124341 | A1 | 5/2007 | Lango et al. |

OTHER PUBLICATIONS

Form PCT/ISA/210, PCT/US06/02405, "PCT International Search Report," 2 pgs.
Form PCT/ISA/237, PCT/US06/02405, "PCT Written Opinion of the International Searching Authority," 4 pgs.
Form PCT/ISA/220, PCT/US06/30928, "PCT Notification of Transmittal of The International Search Report and the Written Opinion of the International Searching Authority, or the Declaration," 1 pg.
Form PCT/ISA/210, PCT/US06/30928, "PCT International Search Report," 3 pgs.
Form PCT/ISA/237, PCT/US06/30928, "PCT Written Opinion of the International Searching Authority," 6 pgs.
Form PCT/ISA/220, PCT/US06/30927, "PCT Notification of Transmittal of The International Search Report and the Written Opinion of the International Searching Authority, or the Declaration," 1 pg.
Form PCT/ISA/210, PCT/US06/30927, "PCT International Search Report," 2 pgs.
Form PCT/ISA/237, PCT/US06/30927, "PCT Written Opinion of the International Searching Authority," 7 pgs.
Form PCT/ISA/220, PCT/US06/38260,"PCT Notification of Transmittal of The International Search Report and the Written Opinion of the International Searching Authority, or the Declaration," 1 pg.
Form PCT/ISA/210, PCT/US06/38260, "PCT International Search Report," 2 pgs.
Form PCT/ISA/237, PCT/US06/38260, "PCT Written Opinion of the International Searching Authority," 3 pgs.
Form PCT/ISA/220, PCT/US06/38291, "PCT Notification of Transmittal of The International Search Report and the Written Opinion of the International Searching Authority, or the Declaration," 1 pg.
Form PCT/ISA/210, PCT/US06/38291, "PCT International Search Report," 2 pgs.
Form PCT/ISA/237, PCT/US06/38291, "PCT Written Opinion of the International Searching Authority," 3 pgs.
Form/IB/373, PCT/US06/038260, "International Report on Patentability," 1 pg.
Form/IB/373, PCT/US06/038291, "International Report on Patentability," 1 pg.
Form EPO/1507S, PCT/US06/002405, "EPO Communication" 1 pg.
Form EPO/1503, PCT/US06/002405, "Supplementary European Search Report", 3 pgs.
Form EPO/P0459, PCT/US06/002405, "Annex to the European Search Report", 1 pg.
Form EPA/2906, PCT/US06/002405, "Examination", 5 pgs.
Adams K. Geographically Distributed System for Catastrophic Recovery. LISA 2002,, Nov. 3-8, 2002, pp. 47-64.
Rosenblum, M and Ousterhout, J.K, 1992. The design and implementation of a log-structured file system. ACM Trans. Comput. Syst. 10,1 (Feb. 1992), 26-52 DOI= http://doi.acm.org/10.1145/146941.146943.
Gait, J,1991. Stability, Availability, and Response in Network File Service. IEEE Trans. Softw. Eng. 17, 2(Feb.1991),133-140 DOI= http://dx.doi.org/10.1109/32.67594.
Spurzem B: "Mimosa NearPoint for Microsoft Exchange Server" Internet [Online] Jan. 2005, pp. 1-18, XP002519249 Retrieved from the Internet: URL:http://www.Flexnet.com/Exchange_Email_Archiving_and_Compliance/ NearPoint%20Architecture%20for%20Exchange.pdf> [retrieved on Mar. 11, 2009] * p. 5, line 18-line 20 * * p. 6, line 2-line 5 * * p. 6, line 16-line 26 * * p. 7, line 22-line 33 * * p. 8, line 4-line 15 * * p. 8, line 25-line 28 * * figure 2 *.
Spurzem B: "Advantages of Mimosa NearPoint for Email Archival" Internet, [Online]Jan. 2005, pp. 1-14, XP002519383 Retrieved from the Internet: URL:http://www.Flexnet.com/Exchange_Email_Archiving_and_Compliance/NearPoint%20E-mail%20Archive%20for%20Exchange.pdf> [retrieved on Mar. 11, 2009] * p. 3, line 1-17 * * p. 9, line 1-p. 11, line 8 * * figure 1 *.
Mimosa Systems: Mimosa Architecture Internet, [Online] Oct. 29, 2004, pp. 1-5, XP002519438 Retrieved from the Internet: URL:http://web.archive.org/web/20041029172122/www.mimosasystems.com/arch.htm> [retrieved on Mar. 11, 2009] * p. 4, line 5-line 24*.
Kupsys, A.; Ekwall R., "Architectural Issues of JMS Compliant Group Communication," Network Computing and Applications, Fourth IEEE International Symposium on Volume, Issue, Jul. 27-29, 2005 pp. 139-148.
Narasimhan P. et al. "Eternal—A component-based framework for transparent fault-tolerant CORBA". In Software—Practice and Experience. vol. 32, No. 8, pp. 771-788. Jul. 10, 2002.
Form EPO/2001A, EP 06 78 9594, PCT/US06/30928, "EPO Registered Letter" 1 pg.
Amendment/Response for European Search Opinion, EP 06 78 9594, Aug. 18, 2010, 31 pgs.
Form EPO/1507S, EP 06 78 9594, PCT/US06/30928, "EPO Communication" 1 pg.
Form EPO/1503, EP 06 78 9594, PCT/US06/030928, "Supplementary European Search Report", 3 pgs.
Form EPO/P0459, EP 06 78 9594, PCT/US06/030928, "Annex to the European Search Report", 1 pg.
Form EPA/2906, EP 06 78 9594, PCT/US06/030928, "Examination Communication", (Search Opinion), 7 pgs.
Veritas: "Planning a Microsoft Exchange Server Data Protection Strategy Using Version 8.0 of Backup Exec for Windows NT/2000" Internet Citation, 1999, pp. 1-23, XP002545353.
NSI Software: "NSI Solutions With Microsoft VSS" Internet, [Online] Mar. 2004, pp. 1-8, XP 002545228.
Microsoft: "Volume Shadow Copy Service Technical Reference" Microsoft Technet, [Online] 28 Mar. 28, 2003, pp. 1-18 XP002545229.

* cited by examiner

Disaster Recovery NearPoint Server Configuration Check Report

Disaster Recovery NearPoint Server Configuration Check Report
Validate whether the Production and DR NearPoint Server are setup with identical configurations. If the configuration check fails, reinstall DR NearPoint Server with identical configurations.

DR Site Capability Check Report

| Field | Primary Nearpoint | Secondary Nearpoint |
|---|---|---|
| ✓ Installation Path | C:\Program Files\Mimosa | C:\Program Files\Mimosa |
| ✓ Shadow Direc... | C:\Program Files\Mimosa\Common\Shadow | C:\Program Files\Mimosa\Common\Shadow |
| ✓ Indexed Obje... | C:\Program Files\Mimosa\Common\Smart... | C:\Program Files\Mimosa\Common\Smart... |
| ✓ Mimosa Data... | \\10.55.20.121\C$\Program Files\Micros... | \\10.55.20.43\C$\Program Files\Microso... |
| ✓ Mimosa Data... | \\10.55.20.121\C$\Program Files\Micros... | \\10.55.20.43\C$\Program Files\Microso... |
| ✓ Database User | npsqluser | npsqluser |
| ✓ Mimosa Activi... | \\10.55.20.121\C$\Program Files\Micros... | \\10.55.20.43\C$\Program Files\Microso... |
| ✓ Mimosa Activi... | \\10.55.20.121\C$\Program Files\Micros... | \\10.55.20.43\C$\Program Files\Microso... |
| ✓ Activity Data... | npsqluser | npsqluser |

◁ Back | Finish | Cancel

FIG.14

ENTERPRISE SERVICE AVAILABILITY THROUGH IDENTITY PRESERVATION

RELATED APPLICATIONS

This application is a continuation in part application of U.S. patent application Ser. No. 11/211,056, filed Aug. 23, 2005 now U.S. Pat. No. 7,778,976, which claims the benefit of U.S. Patent Application No. 60/650,556, filed Feb. 7, 2005.

TECHNICAL FIELD

The disclosed embodiments relate to data management and, more particularly, to providing enterprise service availability through identity preservation.

BACKGROUND

Servers like enterprise servers host critical production data in their storage systems and may require this data to be resilient to a variety of failures, which could range from media to data center failures. In addition there may be a need for other enterprise servers to concurrently access this same critical data. These applications might include for example analysis, monitoring and supervision of server functions to verify, for example, application or data compatibility. The former need may be addressed by a range of data protection schemes that may include tape-based backup and the latter need may be addressed by a range of data management schemes that may include setting up a specialized analysis server with a replica of that critical production data and/or software.

Typical data protection and management schemes may vary in their approach and are deficient in numerous areas. For example, deficiencies in typical approaches can relate to a lack of application intelligence. Block and file based approaches are not application intelligent and do not preserve the integrity and consistency of server applications and/or data. If data corruption strikes the primary server database, the corruption is replicated to the typical disaster recovery copy of the data, rendering it corrupt. Additionally, traditional server disaster recovery solutions are file system based and require scripts and manual steps to re-configure server services for failover. Manual steps are error prone and time consuming and scripts are customized per site and are expensive to maintain. Furthermore, typical disaster recovery approaches force unsupported agents and filter system drivers and matching standby server names which can cause production system failures, mis-configuration and generally increase overall management complexity. Also, direct access to the enterprise server by other servers can result in instability and performance load on the enterprise servers, while other deficiencies may relate to the serial and offline nature of tape storage. Consequently, there is a need for systems and methods that provide enterprise service availability while preserving server identities.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

FIG. 14 is an example NearPoint™ Check Report, under an embodiment.

DETAILED DESCRIPTION

Figure 1:
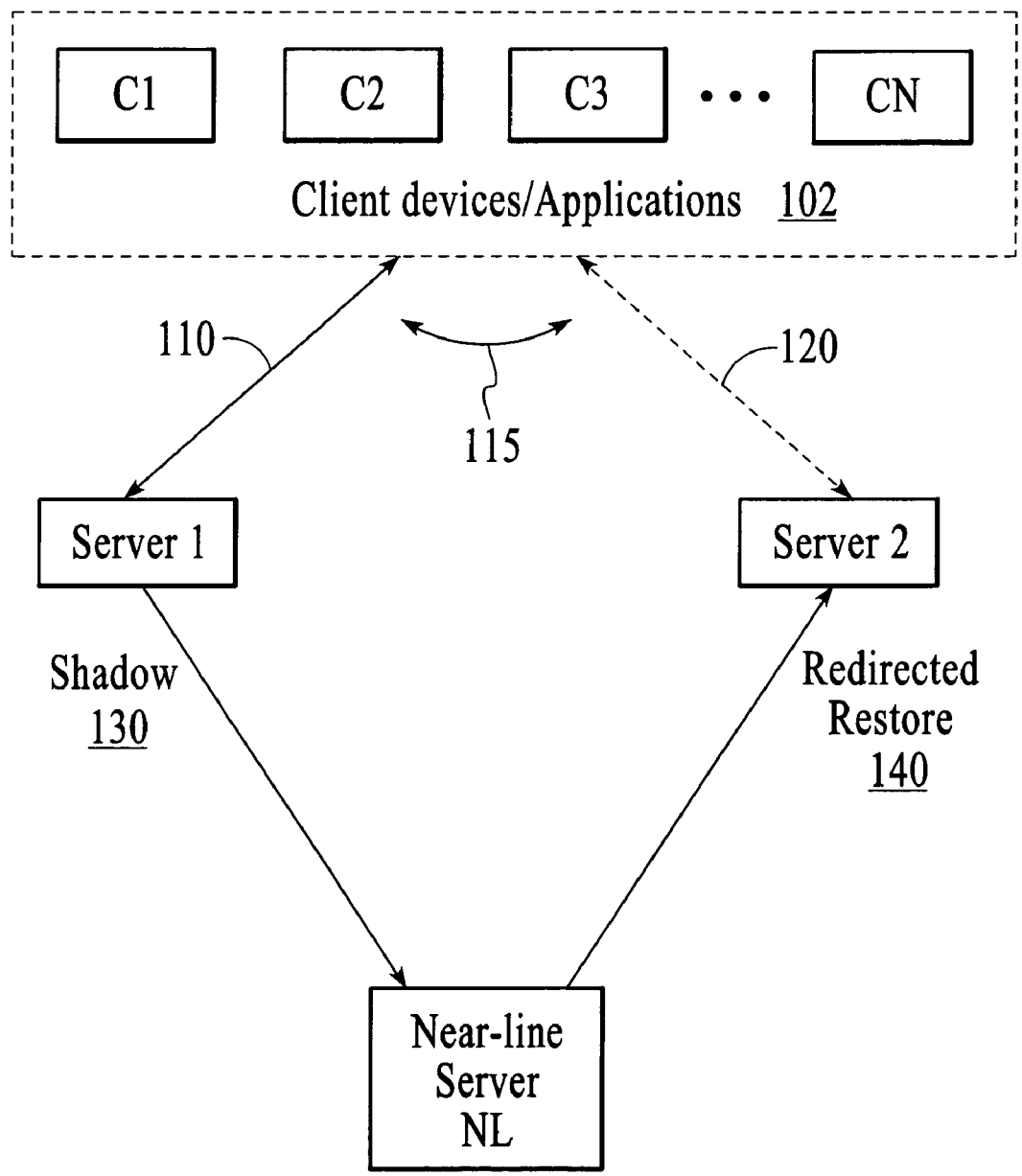
FIG. 1 is a block diagram of a Service Preservation System (SPS), under an embodiment.

Systems and methods are described for service availability that provides automated recovery of server service in a timely and application intelligent manner, maintaining application consistency and integrity, while preserving server identity. The systems and methods, collectively referred to herein as a Service Preservation System (SPS), manage complete recovery of server data and preserve continuity of server service, reestablishing user access to server(s) after an event or disaster in which in which primary or other server(s) fail. The failures, disasters, and losses referred to herein can be at many levels and include, but are not limited to, accidental deletion of an item, loss of an entire mailbox, loss of an entire disk drive, loss of an entire server, and/or loss of an entire server site.

As an example, Microsoft® Exchange Server (alternatively referred to herein as an Exchange Server) demands the highest levels of data protection and availability including off-site data replication for protection of electronic mail archive data and electronic mail service continuity against site disasters or system outages. In this example, the SPS of an embodiment provides automated disaster recovery of Exchange service in an application intelligent manner maintaining application consistency and integrity. Using the SPS, administrators recover Exchange services to a local (or remote) standby Exchange Server, with a "one-click" operation. The SPS of an embodiment is available from Mimosa Systems, Inc., of Santa Clara, Calif., as the NearPoint™ for Microsoft® Exchange Server Disaster Recovery Option.

The SPS of an embodiment is an add-on module that integrates with a near-line server (also referred to herein as a near-point server, which can include the Mimosa Near-Point™ server) and performs fully automated recovery of primary server services in the event of an event in which a server fails and/or data is lost. The near-line server(s) can be located locally with the enterprise servers or remotely, depending on enterprise needs. For local server data protection, the SPS protects the local server using application shadowing that does not rely on agent or filter system driver software. For replication of the near-line server data to a remote site, the SPS can integrate with third-party replication software for example. With this combined approach, the SPS addresses local server recovery using shadowing while catastrophic events are addressed by leveraging the combination of shadowing and service preservation, as described in detail herein. The application intelligent recovery of the SPS described herein preserves consistency and integrity of server data and thus ensures a corruption free copy of server databases.

In addition to service preservation, the SPS of an embodiment can be used to confirm configuration setup (e.g., hardware, software, data, etc.) of server resources as well as to conduct pre-tests or dress rehearsals of a service preservation system. Events for which the service confirmation might be used include migrating server data to new software versions and taking primary servers down for maintenance to name a few. Data migration refers to the transferring of data between computer systems, storage types, and/or formats. Migrating servers or data in the SPS of an embodiment uses components of the SPS to perform data migration in a manner similar to that described herein for service preservation. The SPS of an embodiment includes an Administration Console that manages all disaster recovery configurations and policies with wizard-driven menus that guide the administrator. Pre-tests, also referred to as dress rehearsals, rehearsals, or drills, confirm configuration setup and disaster status reports continuously monitor the complete recovery configuration. In the event of a server or server site loss the SPS completely automates the recovery of server services to a standby server for example and preserves all archive data.

The SPS, as described in detail herein, provides full server service recovery including restoring server data, rebinding mailboxes and re-establishing server services ensuring fast, reliable restoration of service to end-users while eliminating any requirement that the enterprise server name match the primary enterprise server name. The SPS also provides automated disaster recovery of electronic mail services (e.g. Exchange) and near-line server archive services in a single integrated solution, with simplified configuration and management of disaster recovery. The SPS is a zero-footprint recovery solution that operates without requiring agent or kernel driver software installed on the server, thereby eliminating the typical causes of instability and eliminating the competition for processor, memory and storage resources.

In the following description, numerous specific details are introduced to provide a thorough understanding of, and enabling description for, embodiments of the SPS. One skilled in the relevant art, however, will recognize that the SPS can be practiced without one or more of the specific details, or with other components, systems, etc. In other instances, well-known structures or operations are not shown, or are not described in detail, to avoid obscuring aspects of the SPS.

FIG. 1 is a block diagram of an SPS 100, under an embodiment. The SPS 100 configuration is flexible in that it can be configured to match the particular configuration and/or requirements of each server site. This flexibility allows the SPS 100 to provide enterprise server recovery, near-line server recovery, and site recovery, all of which are described below, and can support item, mailbox, and drive recovery. Generally, the SPS 100 includes a near-line server NL coupled to a first server S1 and a second server S2. The first server S1, which can be referred to as a primary server and which can include multiple servers, functions as a primary server S1 of an enterprise and in so doing couples or connects to provide server services to numerous client devices and/or applications CN (where N is any number 1, 2, 3, . . . ). The client devices and/or applications CN, individually or collectively referred to herein as clients 102, can include any number N of clients located at any number of sites and coupled to the primary server S1 via any number of couplings or connections. The second server S2, which can also include multiple servers, functions as a backup or standby server S2 of an enterprise and in so doing is capable of coupling or connecting to provide server services to the clients 102. While the near-line server NL is shown as a single near-line server NL, it includes clustered, distributed, replicated, and virtualized server architectures, and further may span multiple machines and/or sites.

The near-line server NL continuously shadows 130 the primary server S1 during normal operations of the primary server S1. Thus, clients 102 are directed 110 to the primary server S1 during normal operations, and the near-line server NL generates and stores a replica or copy of all data of the primary server S1. In response to a detected failure of the primary server S1, the near-line server NL performs a redirected restore 140 to the standby server S2. The redirected restore 140 includes operations during which the near-line server NL propagates or copies the replica of the primary server data to the standby server S2. The near-line server NL also fails-over or re-homes 115 all clients 102 to the standby server S2 so that, upon restart of the clients 102, continuity of server services is preserved by automatically re-establishing access 120 to the services by the client devices 102 via the standby server S2.

Shadowing as used herein includes creating and maintaining a replica of enterprise application data in an application consistent manner. This is superior to, and relatively more efficient than, traditional replication or continuous data protection. Shadowing is also relatively more efficient than traditional capture using mechanisms such as Messaging Application Programming Interface (MAPI) or Simple Mail Transfer Protocol (SMTP). Application data that is being shadowed is being stored on the near-line server NL in the format of the original application, and is available to the primary server S1 and/or to a standby server S2 either immediately or in near real-time when there are data corruptions or unrecoverable media failures.

The clients (e.g., Enterprise Clients) and servers (e.g., Enterprise Servers and Alternate Servers) can be any type and/or combination of processor-based devices. Reference to a system and/or a server in the singular tense may include multiple instances of that system or server. Couplings between various components of the SPS embodiments described herein can include wireless couplings, wired couplings, hybrid wired/wireless couplings, and other network coupling types, as appropriate to the host system configuration. The network components and/or couplings between components of the SPS can include any of a type, number, and/or combination of networks and the corresponding network components including, but not limited to, a wide area network (WAN), local area networks (LAN), metropolitan area network (MANs), proprietary network, backend network, and the Internet to name a few. Use herein of terms like transport, interconnect, or network is inclusive of a conventional Ethernet, a Storage Area Network (SAN), and/or other type of network. The protocols may be inclusive of Transmission Control Protocol (TCP)/Internet Protocol (IP) (TCP/IP) and layered protocols, Internet Small Computer System Interface (SCSI) (iSCSI), Fibre Channel, InfiniBand, HyperTransport (HT), Virtual Interface (VI), Remote Direct Memory Access (RDMA), and a range of other protocols.

Figure 2A:
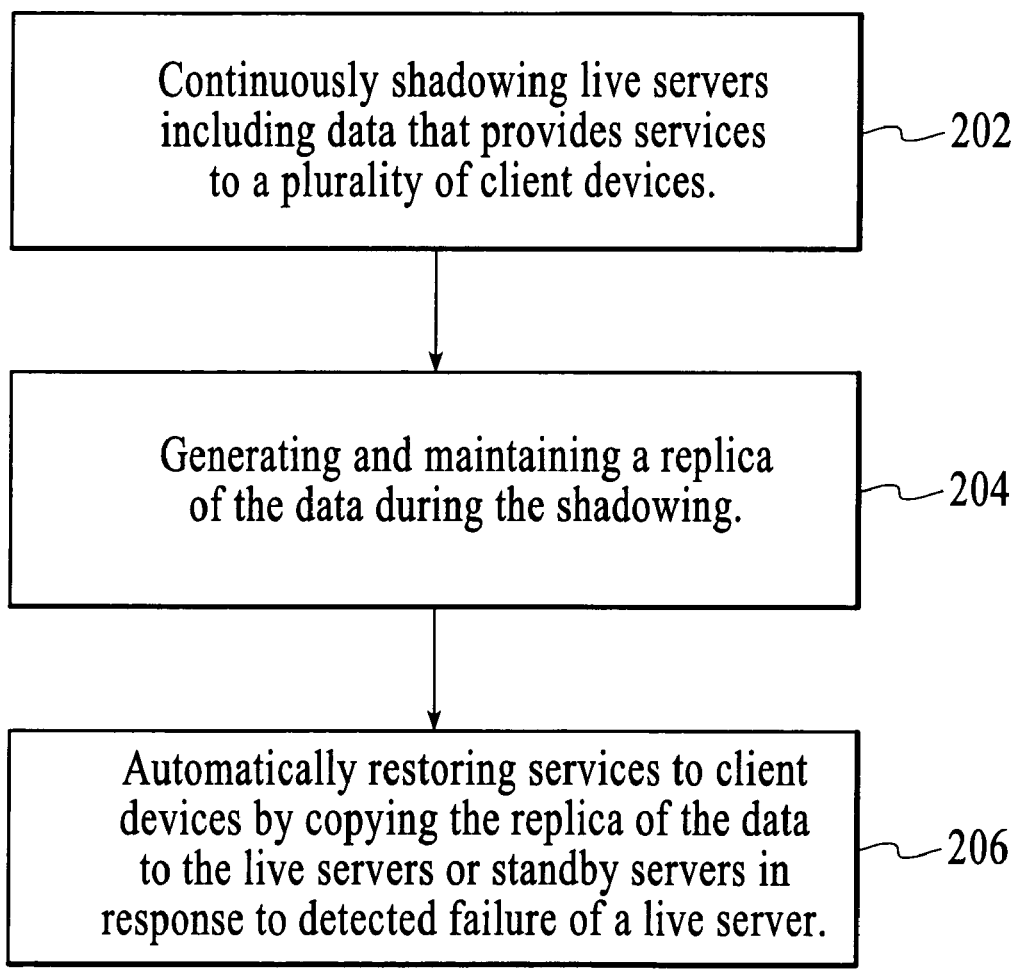
FIG. 2A is a flow diagram of service preservation, under an embodiment.

FIG. 2A is a flow diagram of service preservation 200, under an embodiment. Components of the SPS function to continuously shadow 202 one or more live servers. The live servers include data that provides services to multiple client devices. The SPS generates and maintains 204 a replica of the primary server data during the shadowing. Services to clients are automatically restored 206 using one or more standby servers in response to a detected failure of the one or more live servers. The automatic restoration of services to the clients includes copying the replica of the data from the near-line server to one or more standby servers.

In addition to service preservation, the SPS of an embodiment can be used to confirm configuration setup (e.g., hardware, software, data, etc.) of server resources as well as to conduct pre-tests or dress rehearsals of a service preservation system. Events for which the service confirmation might be used include migrating servers to new software versions and taking primary servers down for maintenance to name a few. Migrating servers to new software versions includes use of the SPS for data migration, where data migration is the transferring of data between computer systems, storage types, and/or formats. The service confirmation capability of the SPS functions the same as the service preservation described herein except that service confirmation does not require re-homing of clients.

Figure 2B:
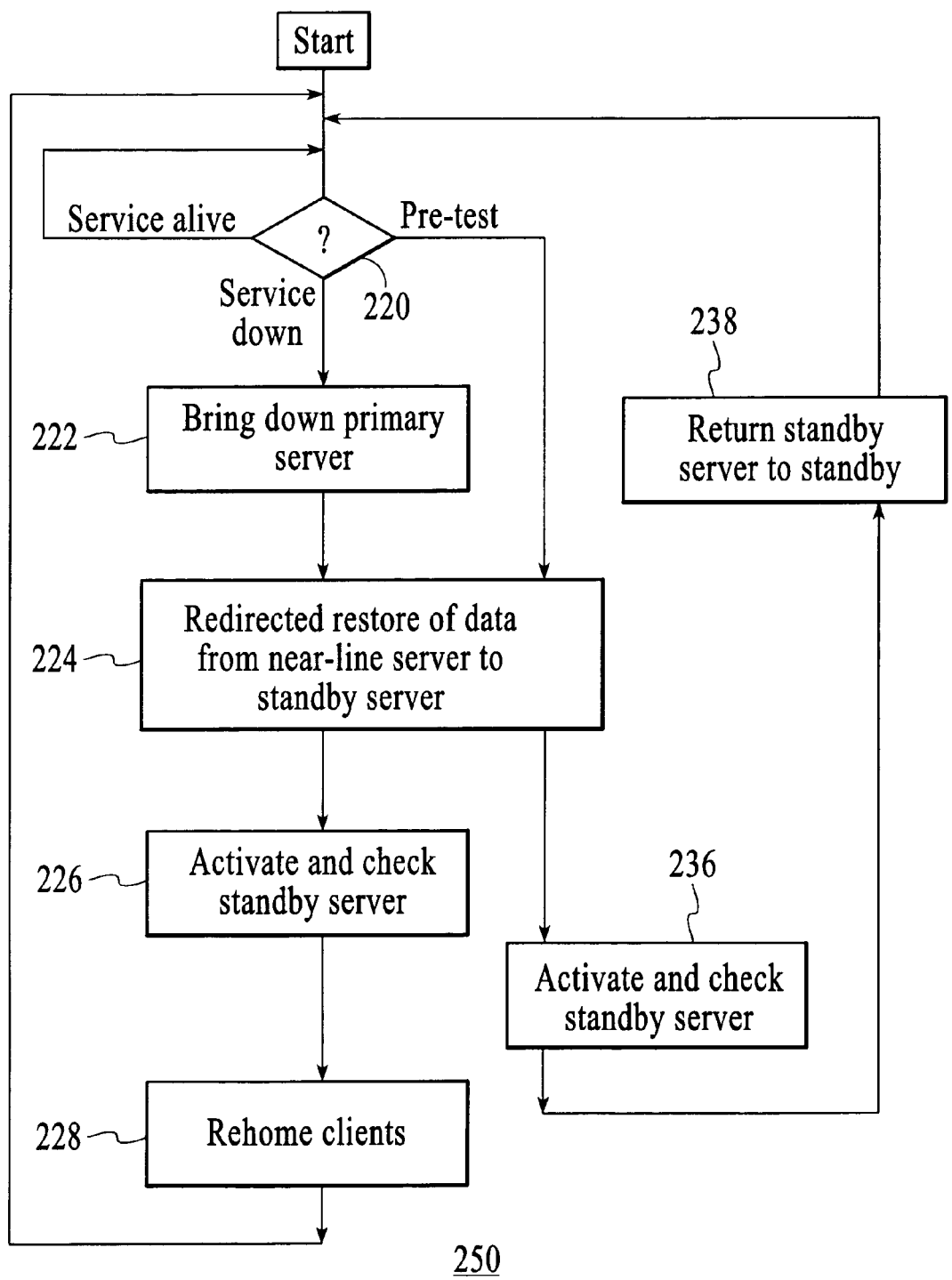
FIG. 2B is a flow diagram of service preservation including service confirmation, under an embodiment.

FIG. 2B is a flow diagram of service preservation including service confirmation 250, under an embodiment. Components of the SPS determine 220 a status of the service or if a pre-test has been selected by an administrator. When the SPS determines 220 that enterprise server service is being provided, then operation returns to continue monitoring a status of the service. When the SPS determines 220 that server service is down or unavailable (e.g. due to a failure), the primary server or server site is deactivated 222 or taken down. A redirected restore is performed 224 during which the near-line server copies the replica of the primary server data to the standby server. The standby server is activated 226 and its operation verified or checked. The clients are re-homed 228 to the standby server so that, upon restart of the clients, continuity of server services is preserved by automatically re-establishing access to the services by the clients via the standby server. Operation returns to continue monitoring a status of the service.

When the SPS determines 220 that a pre-test or dress rehearsal has been selected, the primary server or server site continues to provide services to the clients. A redirected restore is performed 224 during which the near-line server copies the replica of the primary server data to the standby server. The standby server is activated 236 so that operation of the standby server can be evaluated for detection of any component and/or application of the standby server. Following verification of standby server operation, the standby server is returned to a standby status 238. Operation returns to continue monitoring a status of the service.

In consideration of service preservation of a server in an enterprise setting or configuration, the SPS of an embodiment provides total disaster protection for primary enterprise servers and automated recovery of enterprise services. The near-line server NL protects the primary server in near real-time using the continuous application shadowing described above. The near-line server NL by itself is capable of restoring enterprise databases, storage groups, and/or the entire enterprise server in the event of a hardware or software failure. The service preservation of an embodiment extends the capability of the near-line server NL and enables automatic restoration of enterprise data to a local and/or remote standby enterprise server, including re-starting of enterprise services and re-mapping of mailboxes in service directories. The automated recovery process of the SPS restores all enterprise server data, rebinds mailboxes in service directories, cleans up system mailboxes rehomes all clients, and restarts enterprise services. Upon completion, users have access to the standby enterprise server with complete access to enterprise electronic mail and archive electronic mail to name a few. Thus, automated recovery of enterprise servers performed by the near-line server NL minimizes loss of service and provides business continuity of critical enterprise services.

One specific server configuration includes the SPS of an embodiment to provide total disaster protection for an Exchange Server and automated recovery of Exchange services. The near-line server protects the Exchange Server in near real-time using continuous application shadowing. As described above, the near-line server is capable of restoring Exchange databases, Storage Groups, or the entire Exchange Server in the event of a hardware or software failure. The near-line server thus functions to provide restoration of Exchange data to a local (or remote) standby Exchange Server, including restarting of Exchange services and re-mapping of mailboxes in Active Directory Server. For Exchange service recovery, therefore, the SPS of an embodiment automatically rebinds mailboxes in Active Directory, identifies Exchange Roles and Services, re-homes Exchange Roles and Services, re-homes Public Folder Store, cleans up system mailboxes and remove duplicate items, restarts Exchange Services, and/or restores Outlook and SSR service to end-users.

Figure 3:
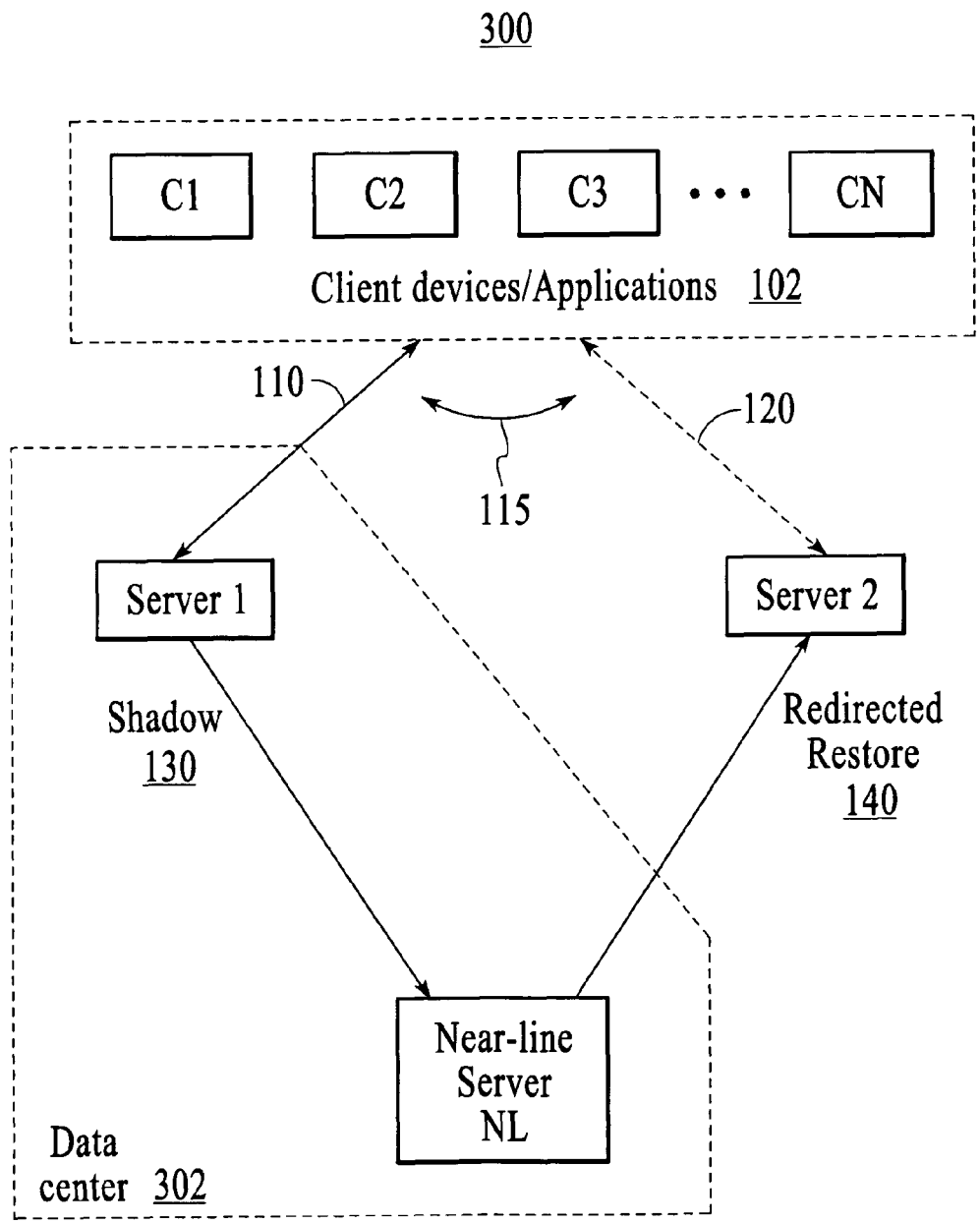
FIG. 3 is a block diagram of an SPS in which the near-line server is located at the same site as the primary server, under an embodiment.
Figure 4:
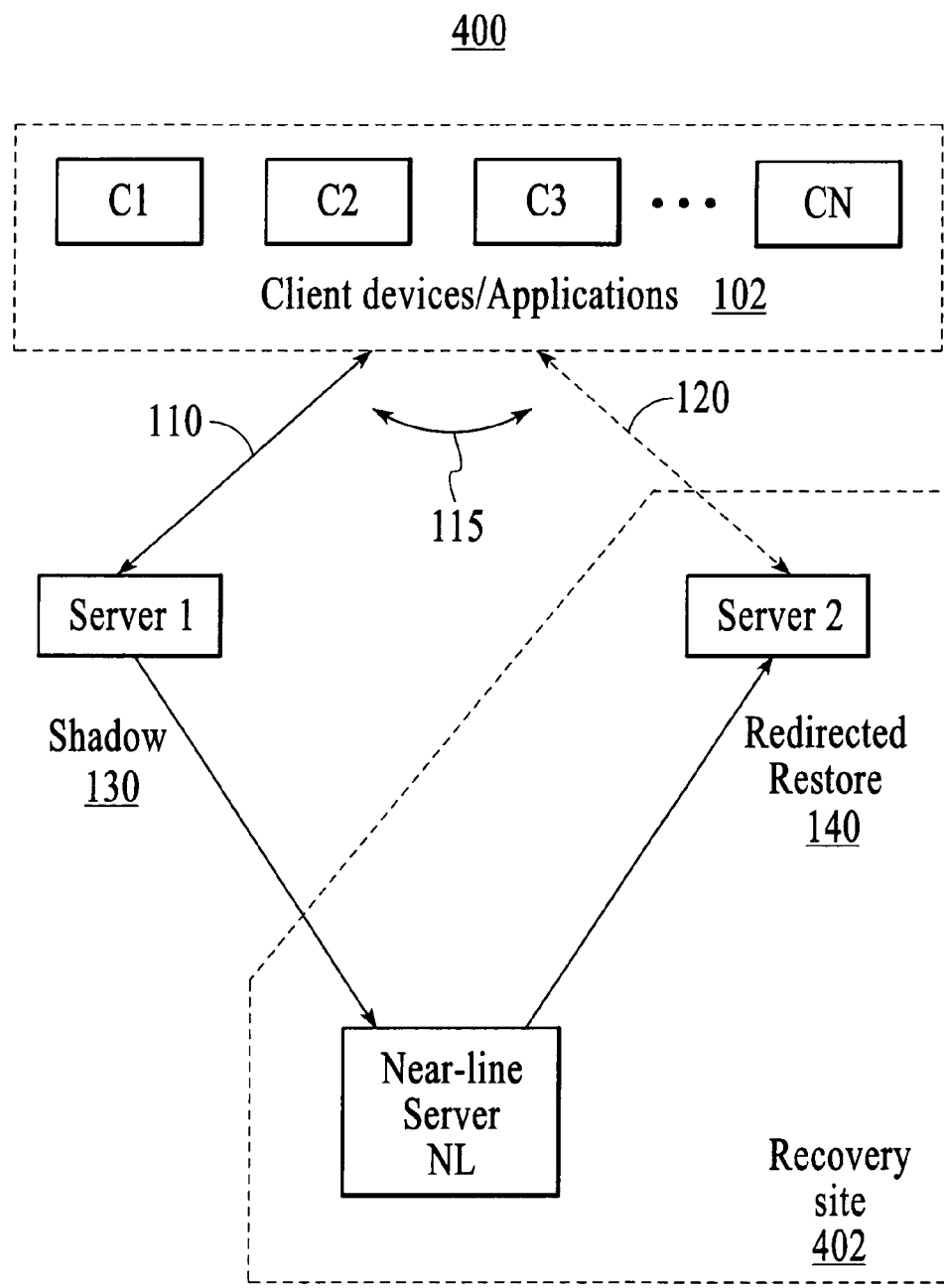
FIG. 4 is a block diagram of an SPS in which the near-line server is located at the same site as the standby server, under an embodiment.

Components of the SPS, including the near-line server, can be physically located at any number of sites. For example, the near-line server can be physically located at the primary site along with the primary server S1. FIG. 3 is a block diagram of an SPS 300 in which the near-line server NL is located at the same site 302 as the primary server S1, under an embodiment. As another example, the near-line server can be physically located at the standby site along with the standby server S2. FIG. 4 is a block diagram of an SPS 400 in which the near-line server NL is located at the same site 402 as the standby server S2, under an embodiment.

Figure 5:
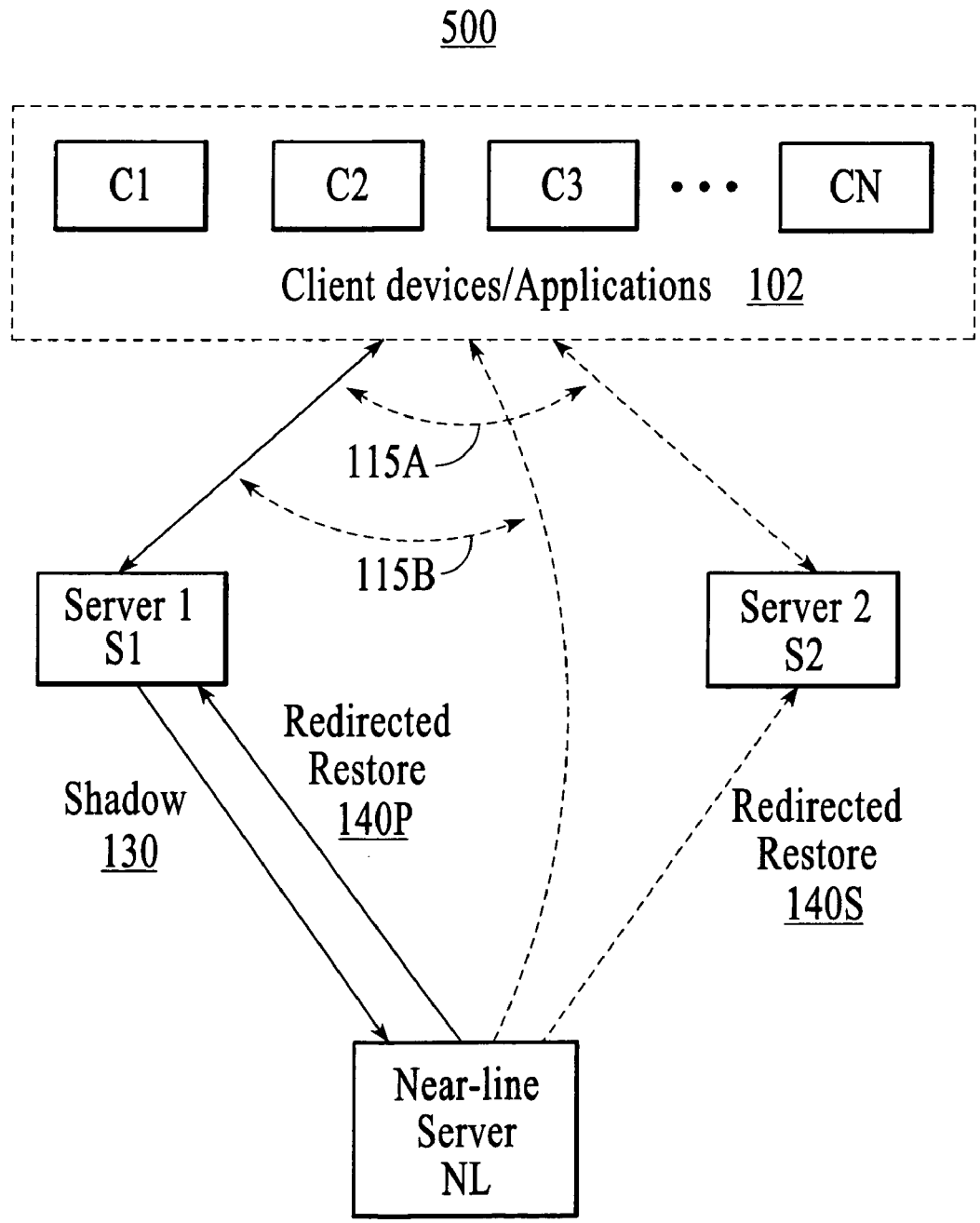
FIG. 5 is a block diagram of an SPS showing the near-line server providing an application consistent copy of data for service preservation, under an embodiment.

Regardless of location of the near-line server NL, the SPS of an embodiment provides via the near-line server NL a recent application consistent copy of data and is therefore able to restore service when there is a server or site failure. FIG. 5 is a block diagram of an SPS 500 showing numerous ways in which the near-line server NL can provide an application consistent copy of data for service preservation, under an embodiment. As described above, if there is a server failure then the near-line server NL can directly provide data access to a replacement or standby server S2 in a redirected restore operation 140S; subsequent to or simultaneous with the redirected restore 140S the standby server S2 provides enterprise services to clients 102 failed over 115A to the standby server S2. Similarly, the near-line server NL can directly provide data access to the primary server S1 in a direct restore operation 140P; subsequent to or simultaneous with the direct restore 140P the primary server S1 continues providing enterprise services to clients 102. Alternatively, the near-line server NL can impersonate a replacement server by using the replica of the enterprise data to directly provide enterprise services to clients 102 failed over 115B to the near-line server NL.

The SPS of alternative embodiments uses the shadowing, redirected restore, and fail-over described above in restoring enterprise services in response to a catastrophic site failure. As described in further detail below, the clients 102 can be failed-over 115A to a replacement (standby) server S2 or failed-over 115B directly to the near-line server NL that is located at a remote disaster recovery site (e.g. recovery site 402 of FIG. 4).

Figure 6:
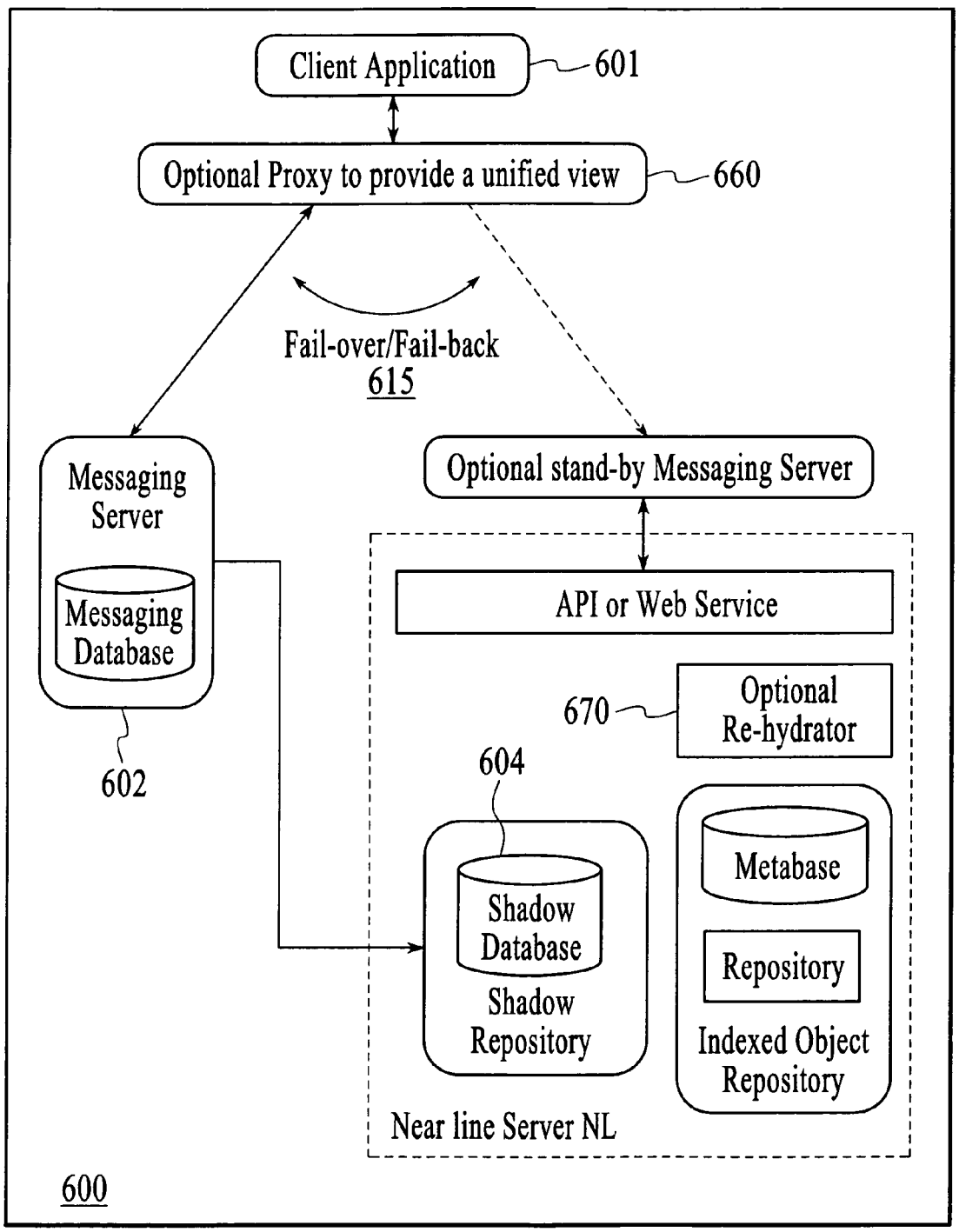
FIG. 6 is an SPS that includes local or remote service preservation, under an embodiment.

FIG. 6 is an SPS 600 that includes local or remote service preservation, under an embodiment. The SPS 600 of this embodiment is an example of providing fail-over service preservation for a messaging server 602; while a messaging server 602 is described in this example, the SPS can be used with any server type, as described above. In operation, the near-line server NL detects (or is notified) that there has been a production failure in the primary messaging server 602. The near-line server NL may proactively plan for such a failure. Upon failure, the near-line server NL is able to materialize from the shadow database 604 the most recent and usable copy of the application data of the primary messaging server 602. This data copy or replica can subsequently or simultaneously be copied over to a hot standby messaging server 612. Alternatively, it is possible to directly serve the data to the standby messaging server 612 using a NAS or SAN data service protocol, and/or replication technologies such as Distributed File System Replication (DFS-R). The near-line server NL can also impersonate the standby messaging server 612 by directly serving the application protocol, which could include MAPI, Internet Message Access Protocol version 4 (IMAP4), or Post Office Protocol version 3 (POP3) or other protocols. Once the data replica is copied to the standby messaging server 612, the client application 601 is failed over 615 to the standby messaging server 612. Furthermore, other data of the messaging server 602 and/or near-line server NL (e.g. the metadata (e.g. Metabase) and Repository of the Indexed Object Repository) can be replicated in an alternative embodiment.

The client 601 and other enterprise components (not shown) may be directly aware of the existence of the primary messaging server(s) 602 and the near-line server NL as distinct entities. Other variations are also possible, which may include the interposing of a proxy 660 entity between the clients 601 and/or one or more other relevant enterprise components, so that the clients 601 continue to get a single system view of the resource or service. This proxy 660 aggregates one or more servers and one or more fail-over entities (e.g. servers). When there is a failure the proxy 660 is able to fail over 615 the requests from the client 601 and/or the enterprise to alternate resources. When the primary resources are restored then the proxy is able to fail the requests back 615 (fail-back) to the primary resources. The proxy 660 (and the enterprise servers and the near-line server NL) may be clustered, replicated, virtualized, distributed, and/or components of a grid. It is possible for portions of the proxy to straddle the client, the enterprise servers, the data surrogate, other enterprise components, or some variation or combination.

During failures it is possible for the near-line server NL to also materialize a historical snapshot of the data through an optional re-hydrator module 670. This historical snapshot may be used in cases where the latest copy of the data may be infested by SPAM or viruses, or if it is not trusted for some reason. For audit purposes it is possible for the near-line server NL to simultaneously serve several snapshots in time to audit applications so that they can obtain a temporal or spatial view of the state of multiple production servers at multiple points in time. The snapshots in time can be served for any granularity of the data that matches specified pattern constituted with data and metadata. The SPS therefore can provide selective rollback and/or roll forward using sophisticated criteria for different portions of the data.

Figure 7A:
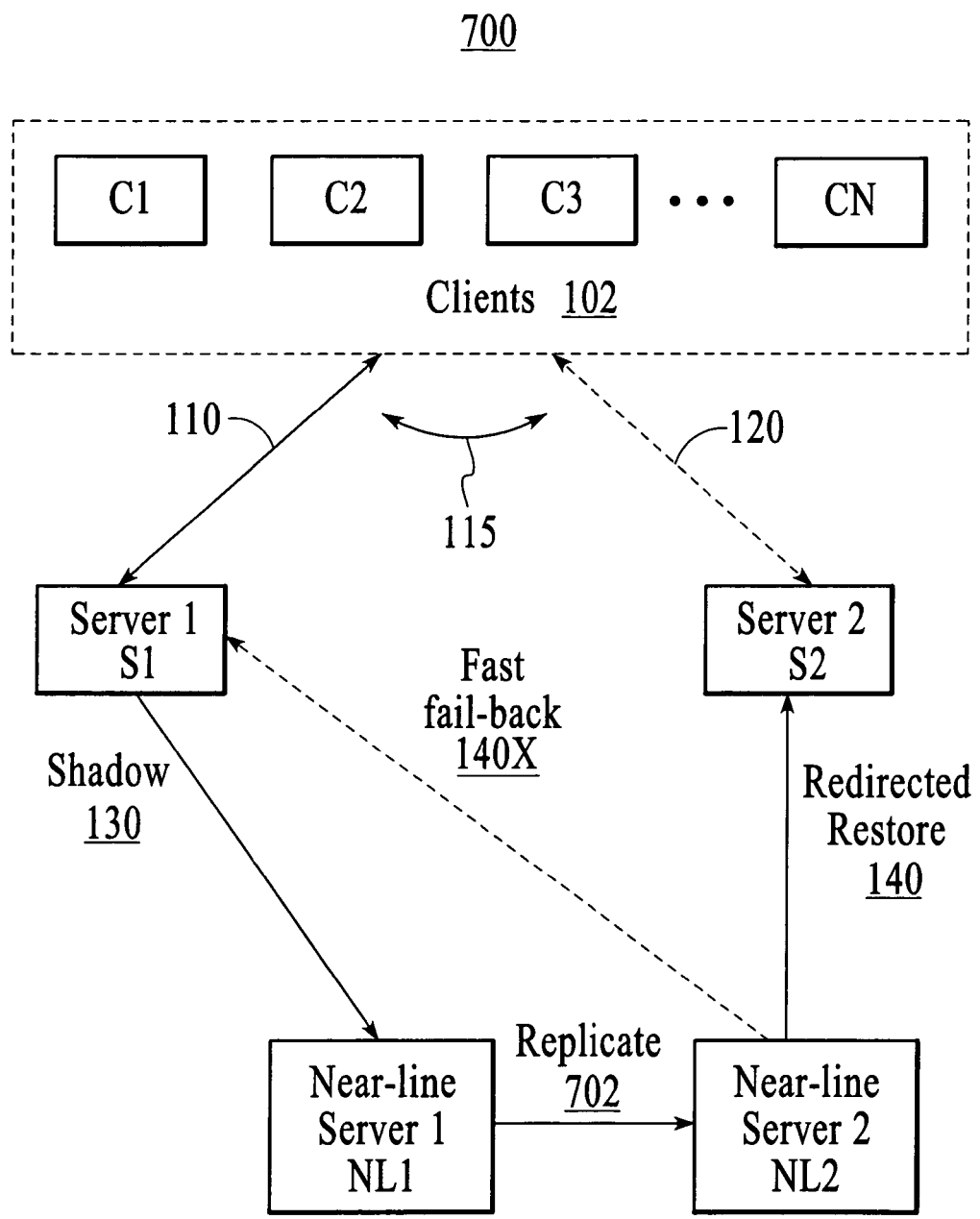
FIG. 7A is a block diagram of an SPS in which the near-line server is replicated on a standby near-line server, under an embodiment.

As described above, the SPS of an embodiment also supports continuous protection of replica data stored on the near-line server. FIG. 7A is a block diagram of an SPS 700 in which the near-line server NL1 is replicated on a standby near-line server NL2, under an embodiment. The SPS 700 includes a first near-line server NL1 coupled to a first server S1. The first server S1, which can be referred to as a primary server and which can include multiple servers, functions as a primary server S1 of an enterprise and in so doing couples or connects to provide server services to numerous clients 102. A second near-line server NL2 is coupled to the first near-line server NL1. The second near-line server NL2 is coupled to provide replica data to the first server S1 and/or to a second server S2 via a redirected restore as described herein. The second server S2, which can also include multiple servers, is coupled functions as a backup or standby server S2 of an enterprise and in so doing is capable of coupling or connecting to provide server services to numerous clients 102.

The first near-line server NL1 can be located at the data center site of the primary server S1, at the recovery site of the standby server S2, or at another remote site. Likewise, the second near-line server NL2 can be located at the data center site of the primary server S1, at the recovery site of the standby server S2, or at another remote site.

The first near-line server NL1 continuously shadows 130 the primary server S1 during normal operations of the primary server S1. Thus, clients 102 are directed 110 to the primary server S1 during normal operations, and the first near-line server NL1 generates and stores a replica or copy of all data of the primary server S1. Furthermore, components of the SPS 700 replicate 702 the data of the first near-line server NL1 on the second near-line server NL2. The replication 702 can be asynchronous, byte-level replication, but is not so limited.

The SPS 700 uses the second or standby near-line server NL2 to protect all data residing on the first near-line server NL1, data that includes the shadow volumes, the SQL database and the message items to name a few. In the event of a single volume failure or a complete system failure on the first near-line server NL1, data can be restored quickly using the second near-line server NL2. When the data restoration is complete, the replication software automatically re-synchronizes the data volumes and replication begins again. In this manner, the critical enterprise data and archive data on the near-line server are always protected.

More specifically, in response to a detected failure (e.g. hardware and/or software failure) of the first near-line server NL1, the second near-line server NL2 is promoted to become active. Once active, the second near-line server NL2 performs a redirected restore 140 to the standby server S2 in response to a detected failure (e.g. hardware and/or software failure) of the primary server S1. The redirected restore 140 includes operations during which the second near-line server NL2 copies the replica of the primary server data to the standby server S2. The second near-line server NL2 also re-homes 115 all clients 102 to the standby server S2 so that, upon restart of the clients 102, continuity of server services is preserved by automatically re-establishing access 120 to the services by the client devices 102 via the standby server S2.

Figure 7B:
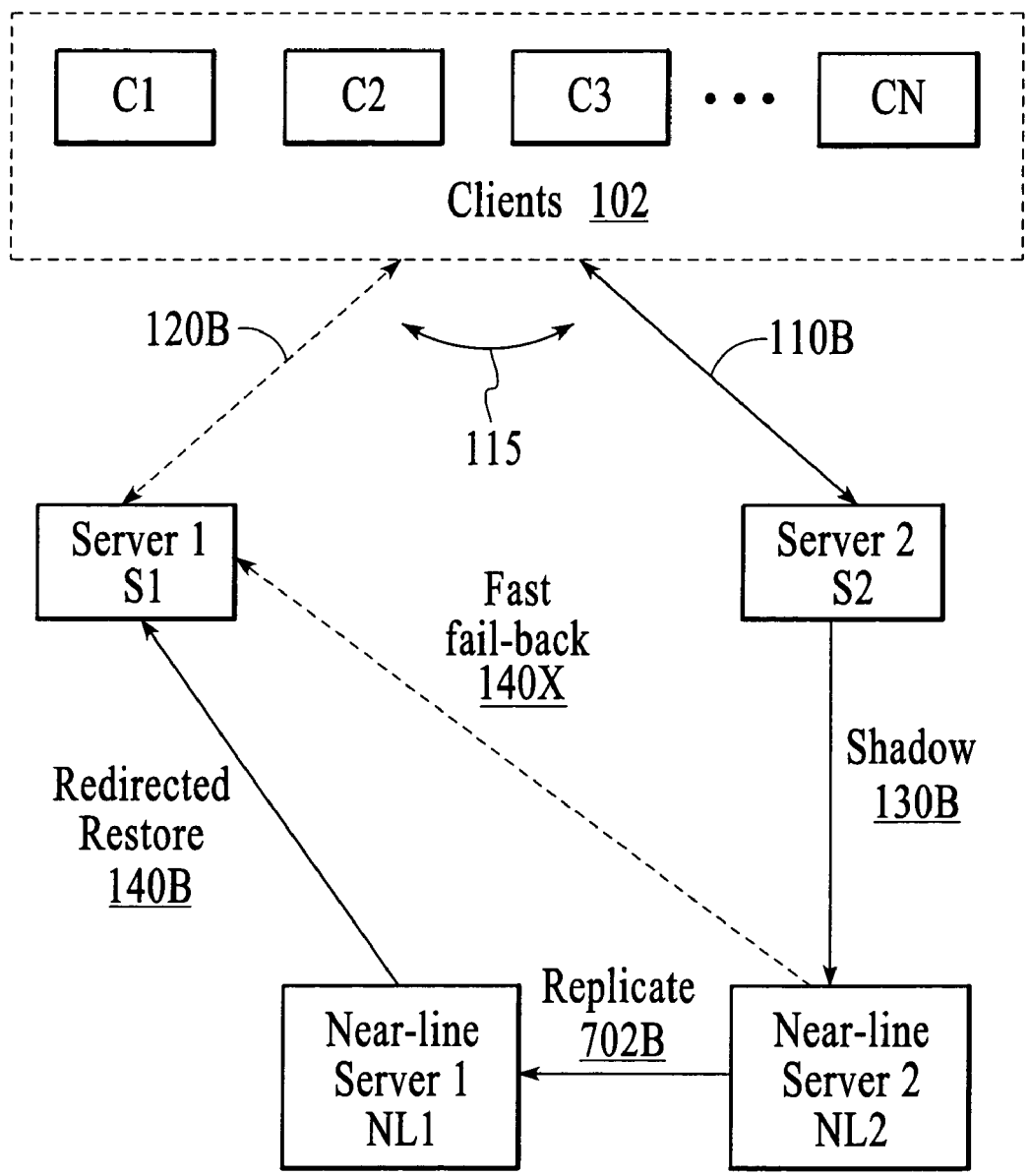
FIG. 7B is a block diagram of the SPS when the standby server is serving as the primary service provider following failure of the primary server, under an embodiment.

The roles of components of the SPS 700 change in operations during which enterprise services are provided by the standby server S2. FIG. 7B is a block diagram of the SPS 700 when the standby server S2 is serving as the primary service provider following failure of the primary server S1, under an embodiment. The second near-line server NL2 continuously shadows 130B the standby server S2 during normal operations of the standby server S2. Thus, clients 102 are directed 110B to the standby server S2 during normal operations, and the second near-line server NL2 generates and stores a replica or copy of all data of the standby server S2. Furthermore, components of the SPS 700 replicate 702B the data of the second near-line server NL2 on the first near-line server NL1.

The SPS 700 now uses the first near-line server NL1 to protect all data residing on the second near-line server NL2. In the event of a single volume failure or a complete system failure on the second near-line server NL2, data can be restored quickly using the first near-line server NL1. When the data restoration is complete, the replication software automatically re-synchronizes the data volumes and replication begins again. In this manner, the critical enterprise data and archive data on the active near-line server are always protected.

When the primary server S1 is returned to service, the second near-line server NL2 can perform a fast fail-back 140X during which the replica data of the second near-line server NL2 is propagated or copied to the primary server S1. The first near-line server NL1 is promoted to become active, and upon becoming active re-homes 115 all clients 102 to the primary server S1 so that, upon restart of the clients 102, continuity of server services is preserved by automatically re-establishing access 110 to the services by the client devices 102 via the primary server S1 as described above with reference to FIG. 7A. Alternatively, upon return of the primary server S1 to service, the first near-line server NL1 can perform a redirected restore 140B of replica data to the primary server S1. The automatic service preservation can straddle multiple geographically disparate sites. This may incorporate multiple mechanisms such as near line servers and incorporate and extend mechanisms that are used for transporting, storing and post-processing data in the data protection application as described above. As a consequence of the distribution of the automatic service preservation, the enterprise data is resilient to catastrophic failures that might include server, data center and site failures. In the presence of such failures it may be possible for the SPS to facilitate service preservation directly to clients and applications by returning recent copies of data and/or facilitating the deployment of replacement servers. This service preservation may involve the cooperation of other enterprise components, or it may involve the introduction of proxies that render these fail-over and fail-back operations transparent, or some variation or combination.

Figure 8A:
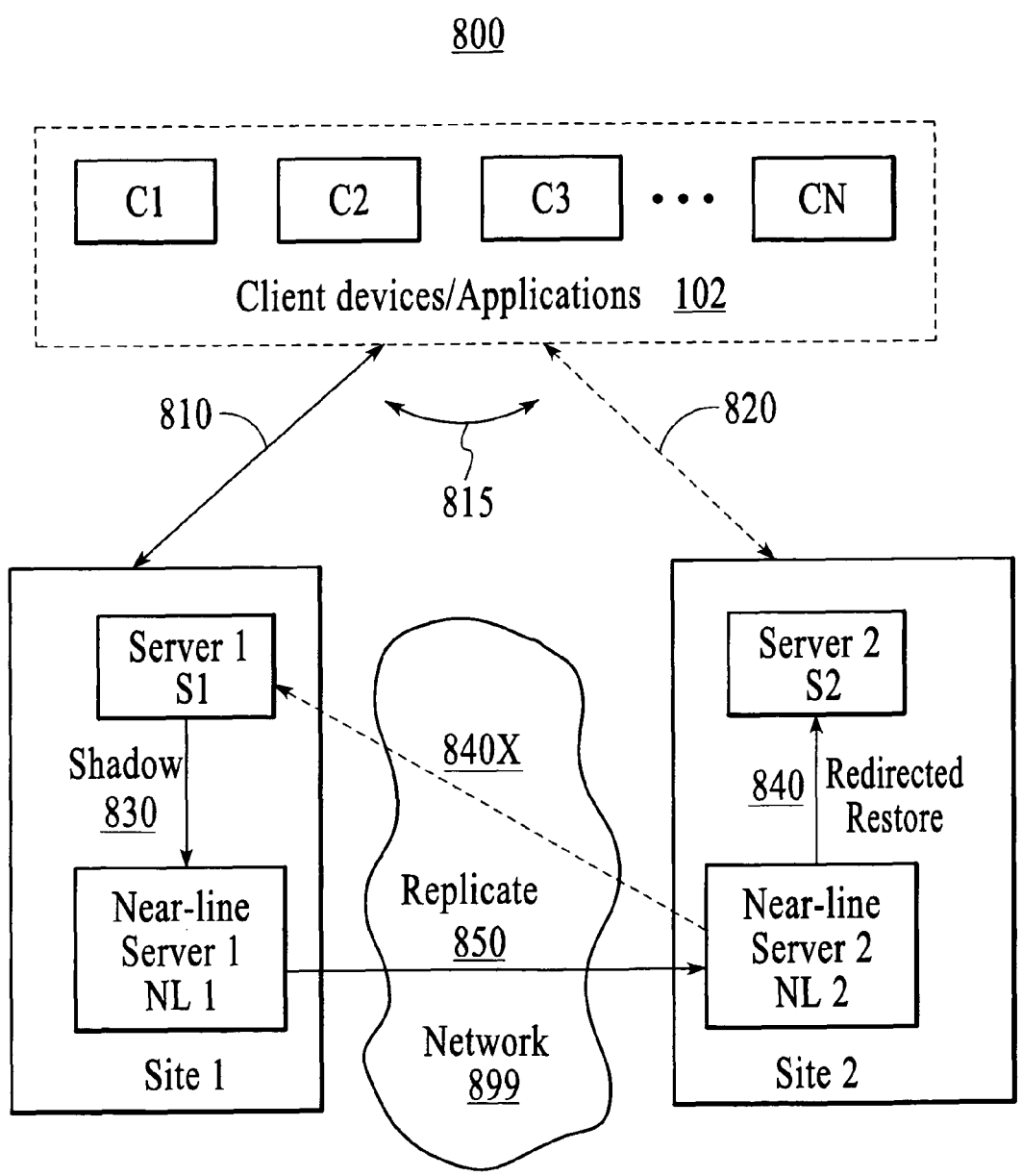
FIG. 8A is a block diagram of an SPS configured to provide server site service preservation, under an embodiment.

Service preservation of server sites provided by the SPS therefore includes protection of all server resources, including enterprise servers and near-line servers. FIG. 8A is a block diagram of an SPS 800 configured to provide server site service preservation, under an embodiment. The SPS 800 configuration is flexible in that it can be configured to match the particular requirements of each site. The SPS 800 includes a first near-line server NL1 coupled to a first server S1 and a second near-line server NL2 coupled to a second server S2. The first near-line server NL1 is coupled to the second near-line server NL2 via one or more network couplings 899 or connections.

The first server S1 and first near-line server NL1 are components of a first server site SITE1 of the enterprise, also referred to as a primary data center SITE1. The first server S1, which can be referred to as a primary server and which can include multiple servers, functions as a primary server S1 of an enterprise and in so doing couples to provide enterprise services to numerous clients 102. The second server S2 and second near-line server NL2 are components of a second server site S1TE2 of the enterprise, also referred to as a recovery data center SITE2. The second server S2, which can also include multiple servers, functions as a backup or standby server S2 of an enterprise and in so doing is capable of coupling or connecting to provide server services to numerous clients 102.

The first near-line server NL1 continuously shadows 830 the primary server S1 during normal operations of the primary server S1. Thus, clients 102 are directed 810 to the primary server S1 during normal operations, and the first near-line server NL1 generates and stores a replica or copy of all data of the primary server S1. Furthermore, components of the SPS 800 replicate 850 data of the first near-line server NL1 on the second near-line server NL2. The replication 850 can be asynchronous, byte-level replication, but is not so limited.

The SPS 800 uses the second or standby near-line server NL2 to protect all data residing on the first near-line server NL1. In the event of a single volume failure or a complete system failure on the first near-line server NL1, data can be restored quickly using the second near-line server NL2 and the second server S2. More specifically, in response to a detected failure (e.g. hardware and/or software failure) of the first server site SITE1, the second near-line server NL2 is promoted to become active and manages failover of enterprise server services. Once active, the second near-line server NL2 performs a redirected restore 840 to the second server S2 of the second site SITE2 in response to a detected failure (e.g. hardware and/or software failure) of the primary server S1. The redirected restore 840 includes operations during which the second near-line server NL2 copies the replica of the primary server data to the second server S2. The second near-line server NL2 also re-homes 815 the clients 102 to the standby server S2 so that, upon restart of the clients 102, continuity of server services is preserved by automatically re-establishing access 820 to the services by the clients 102 via the standby server S2. As described above, when the primary server S1 is returned to service, the second near-line server NL2 can perform a fast fail-back 840X during which the replica data of the second near-line server NL2 is propagated or copied to the primary server S1; alternatively, the second near-line server NL2 can also perform a redirected restore of the replica data to the primary server S1.

Figure 8B:
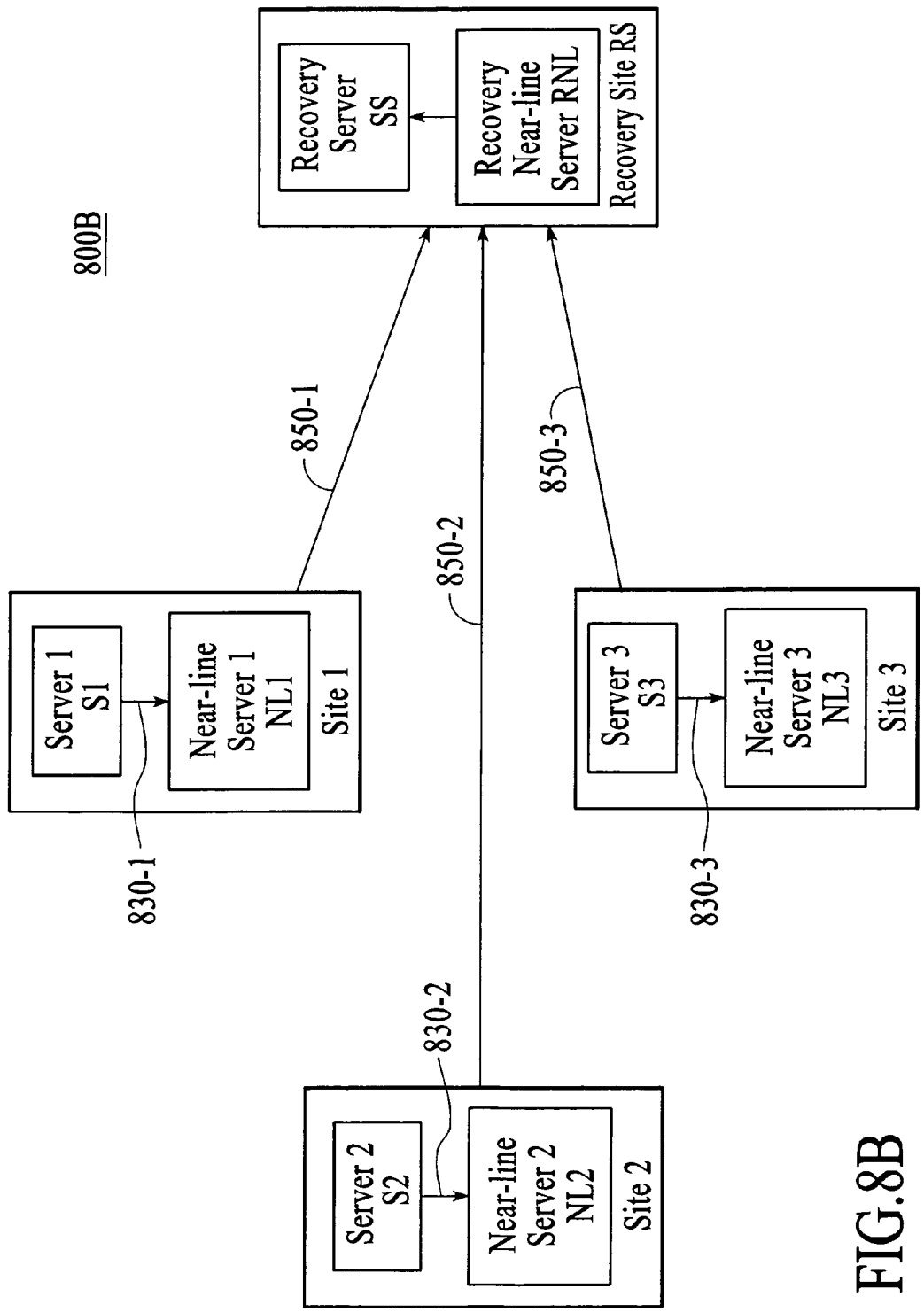
FIG. 8B is a block diagram of an SPS configured to provide service preservation to one or more of multiple server sites, under an embodiment.

FIG. 8B is a block diagram of an SPS 800B configured to provide service preservation to one or more of multiple server sites, under an embodiment. The SPS 800B extends the concepts described above with reference to FIG. 8A to multiple sites. The server sites include a number of production server sites (e.g. site 1, site 2, site 3, etc.). As described above, each production site SITEX (where X represents 1, 2, 3, etc.) includes a primary server SX coupled to a near-line server NLX (e.g., site 1 includes primary server S1 coupled to near-line server NL1, etc.). The near-line server NLX of each production site SITEX continuously shadows 830-X the corresponding primary server SX during normal operations of the primary server SX (e.g., near-line server NL1 shadows 830-1 primary server S1 during normal operations of primary server S1, etc.).

Service preservation is provided using a recovery site RS coupled to each of the production sites SITEX. The recovery site RS includes a recovery server SS coupled to a recovery near-line server RNL. Components of the SPS 800B replicate 850-X data of the near-line server NLX of each site on the recovery near-line server RNL (e.g., data of near line server NL2 of SITE2 is replicated 850-2 on the recovery near-line server RNL at the recovery site RS, etc.). The recovery server RS, which can also include multiple servers, functions as a backup or standby server of the enterprise and in so doing is capable of coupling or connecting to provide server services to numerous clients (not shown) served by any one or all of the production sites in response to a failure of one or more of the production server sites, as described above.

Figure 9:
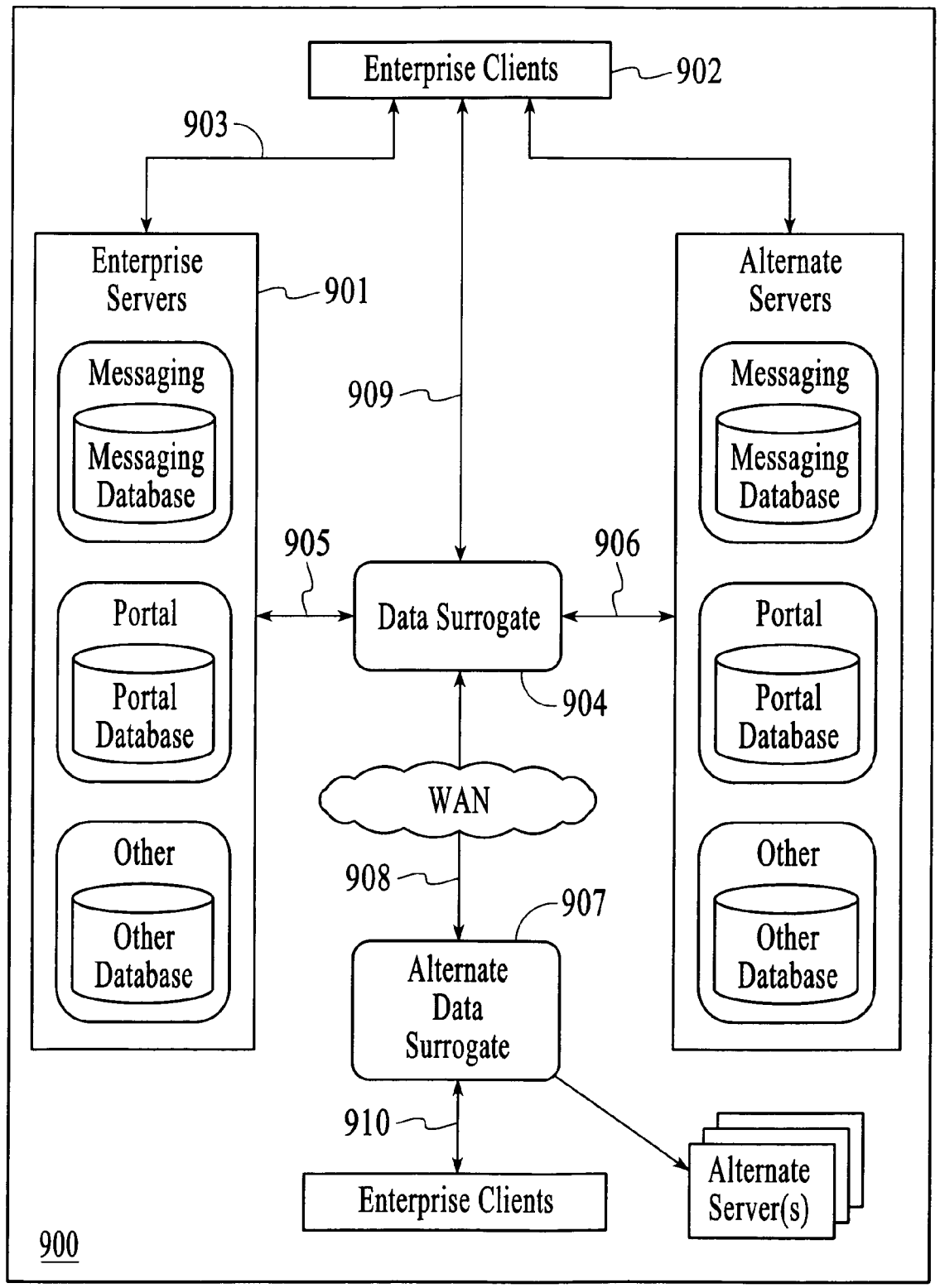
FIG. 9 is a block diagram of an example SPS configured to provide server site service preservation across multiple geographically disparate sites, under an embodiment.

FIG. 9 is a block diagram of an example SPS 900 configured to provide server site service preservation across multiple geographically disparate sites, under an alternative embodiment. The SPS, as described above, generates and maintains application consistent temporal replicas of production data for data management purposes that include service preservation as well as data protection, archival, mailbox extension, self-service, policy management and audit roles, compliance, keyword alerts, legal discovery, litigation support, life-cycle management, tiered storage, disaster protection, business continuity, and service proxies to name a few. The SPS 900 of an embodiment includes one or more of enterprise servers 901, enterprise clients 902, server access 903, data replicas or surrogates 904, shadowing 905, redirection 906, alternate data replicas or surrogates 907, disaster protection 908, self-service and auditor access 909, and service proxies and preservation 910. Each of these components 901-910 of the SPS 900 are described in detail below.

The enterprise servers 901 comprise numerous types and/or combinations of servers that include messaging, collaboration, portals, and/or database servers. The enterprise servers 901 host a variety of structured, semi-structured, and unstructured data. These servers 901 may include individual, clustered, replicated, constituents of a grid, virtualized, and/or any combination or variation. An example enterprise server 901 includes a Microsoft® Exchange Server but the embodiments described herein are not so limited.

Enterprise clients 902 include numerous types and/or combinations of clients that provide end-user access to servers. An example client 902 is Microsoft® Outlook but the embodiments described herein are not so limited.

The interaction between the enterprise clients 902 and servers 901 is referred to herein as server access 903 or normal access. In the example SPS that includes Microsoft® Exchange and Outlook, the protocols for server access 903 may be MAPI but the embodiments described herein are not so limited. Other possible protocols include IMAP4 and POP3.

The data replicas or surrogates 904 enable the various data management solutions for servers and enhanced capabilities for clients as described herein. The SPS 900 of an embodiment can include one or more alternate surrogates 907, which include a remote copy of any data surrogate that is isolated from the source in order to protect production data from catastrophic site disasters. Shadowing 905 as described above maintains a current copy 904 or replica of production enterprise data in a data surrogate. The replica data may be optionally translated into multiple alternate formats and augmented with metadata.

The SPS 900 uses redirection 906 to revive servers 901 and/or alternate servers after the servers 901 and/or alternate servers have incurred any data-related corruptions or loss. The data used in the redirections 906 includes data hosted in the shadow within the data surrogate 904. The term "redirect" is more specifically used when the target server is different from the original server; the term used when the target and original are same is "restore".

Disaster protection 908 refers to the ability of the SPS 900 to restore data and/or service in order to support business operation if there is a catastrophic site disaster. Self-service and auditor access 909 includes the capability for the clients 902 to have direct but secured access to the data surrogate 904; for example this access 909 includes end-user access to their historical archives, and auditors needing to process historical messaging information to name a few. Regarding service proxies and preservation 910, this refers to the existence of an application consistent copy of production data at the data surrogate 904 or one of the alternate surrogates 907 facilitates delivery of the original service or operation of a shadow, proxy or replacement server by the SPS 900 in order to enhance reliability, scale, or efficiency.

The combination of near-line servers to log shipping generates a data surrogate. Generally in an embodiment the primary server is coupled to the near-line server, as described above, and is generating write-ahead logs. The near line server receives the logs and applies them to a baseline copy of the primary server database received previously. The result of application of the logs to the data by the near-line server is an application consistent data surrogate. Log shipping is thus used to generate or create and maintain a shadow copy of data that is updated periodically based on some event or pre-defined schedule. Unlike some forms of traditional log shipping, the data management applications of an embodiment can operate concurrently on the shadow copy while it is being updated. The description of data surrogation provided herein using near line servers or log shipping is just an example since data surrogation may be implemented using a variety of other techniques.

When data surrogation is implemented using a near-line server the near line server is not limited to a single machine, but can include a distributed system involving multiple machines offering various combinations of specialization of function and load balancing for scalability and fault tolerance. Furthermore, the storage for a near-line system may not necessarily be a single storage system, but can include a collection of storage devices, perhaps using a storage area network (SAN), for homogeneous and heterogeneous functions (such as data management, data analysis, brick extraction, indexed object repository, full text indexing, data mining, etc.). Furthermore, the near-line server can be locally replicated in order to facilitate the resiliency of the near-line server and the availability of the data that it is hosting.

Figure 10:
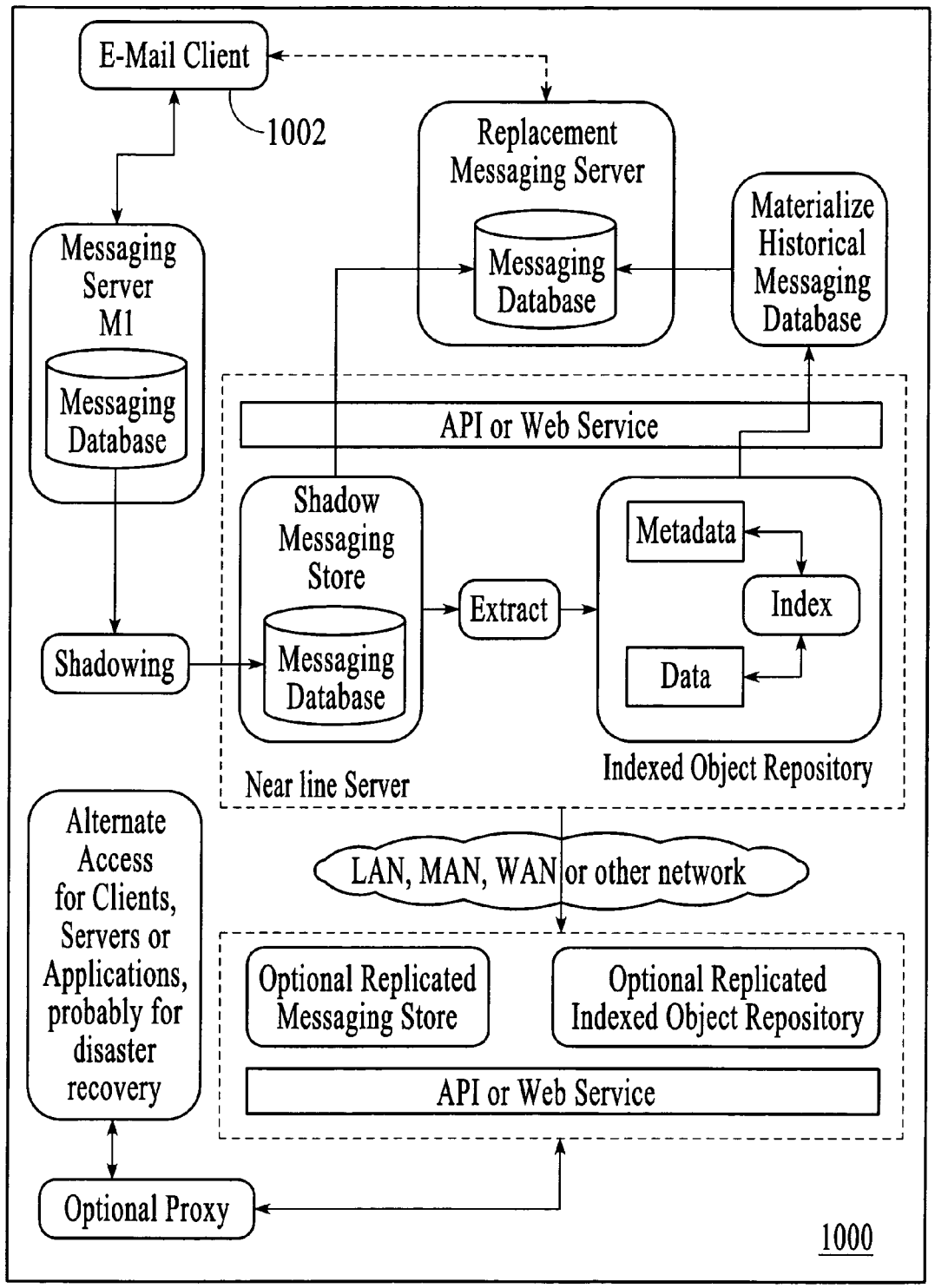
FIG. 10 is a block diagram of an example SPS configured to provide server site service preservation across multiple geographically disparate sites, under an alternative embodiment.

FIG. 10 is a block diagram of an example SPS 1000 configured to provide server site service preservation across multiple geographically disparate sites, under an embodiment.

While messaging servers are used in this example, the concepts are not so limited and may be extended to other types of application servers. Only a single client 1002 and a single messaging server Ml are shown; however this SPS 1000 may be extended to a larger number of clients and servers. In this example, service preservation includes data replication over a suitable network as an example. The SPS 1000 of an embodiment can also include bidirectional replication so that two peer servers (e.g. near-line servers) are leveraging each other for service preservation. This may, in alternative embodiments, be further extended to n-way replication where "n" represents any arbitrary number, and the interconnectivity may use topology as appropriate to include any arbitrary combinations of meshes, trees, graphs, and other variations and combinations. Furthermore, there may be an optional proxy that functions to render the fail-over and the fail-back transparent to the client, the server, other relevant enterprise components, and/or some variation or combination of components.

Figure 11:
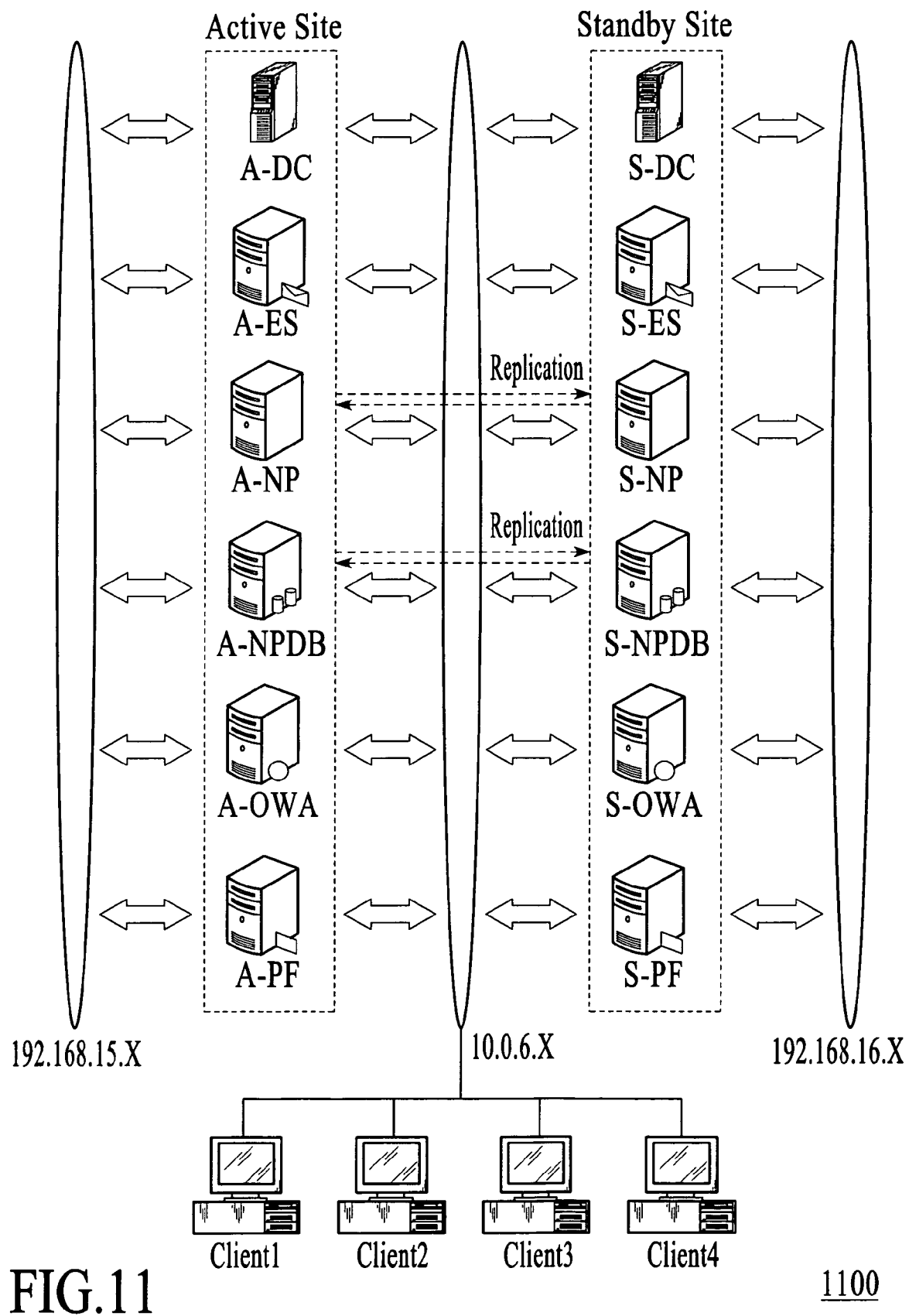
FIG. 11 is a block diagram of another example SPS configured to provide server site service preservation, under another alternative embodiment.

FIG. 11 is a block diagram of another example SPS 1100 configured to provide server site service preservation, under another alternative embodiment. The network configuration includes an Active Site and a Standby Site, but is not limited to one Active Site and one Standby Site. Network connections couple clients (client 1, client 2, client 3, client 4, etc.) to the Active Site and Standby Site. The Active Site includes one or more of a domain controller A-DC, messaging and collaboration server A-ES (e.g. Microsoft® Exchange Server), near-line server A-NP (e.g. Mimosa Systems, Inc. NearPoint™ Server), near-line database server A-NPDB (e.g. Mimosa Systems, Inc. NearPoint™ Database Server), client web access A-OWA (e.g. Microsoft® Outlook Web Access), and public folder server A-PF. Similarly, the Standby Site includes one or more of a domain controller S-DC, messaging and collaboration server S-ES (e.g. Microsoft® Exchange Server), near-line server S-NP (e.g. Mimosa Systems, Inc. NearPoint™ Server), near-line database server S-NPDB (e.g. Mimosa Systems, Inc. NearPoint™ Database Server), client web access S-OWA (e.g. Microsoft® Outlook Web Access), and public folder server S-PF.

An example of operations of the SPS of an embodiment is described below. The SPS of this example is an embodiment that includes the Mimosa NearPoint™ solution integrated with Microsoft® Exchange Server and Active Directory Server. In operation, network or system administrators initiate with a "single-click" complete recovery of Exchange services using recovery policies that are pre-configured and tested to be correct. The following describes policy configuration and recovery operation using the SPS.

The SPS includes many automated features, wizard-driven menus and pre-tests to ensure reliable Exchange recovery. In the event of a server, site or data loss event at a primary data center, an administrator can initiate complete recover of Exchange services via "one-click" at the NearPoint™ Administrator Console. Following is a description of total Exchange recovery using the SPS.

This example assumes Exchange messaging services and NearPoint™ services (SPS) are in full operation and that the Exchange Server and the NearPoint™ server are co-located in the primary data center. NearPoint™ is managing the Exchange Server and has completed a full shadow copy, and the continuous protection process is running with the NearPoint™ Log Shipping. Additionally, NearPoint™ is managing the archive with administrator-defined policies for self-service access, retention and disposition, Mailbox Extension and data exclusion.

Figure 12:
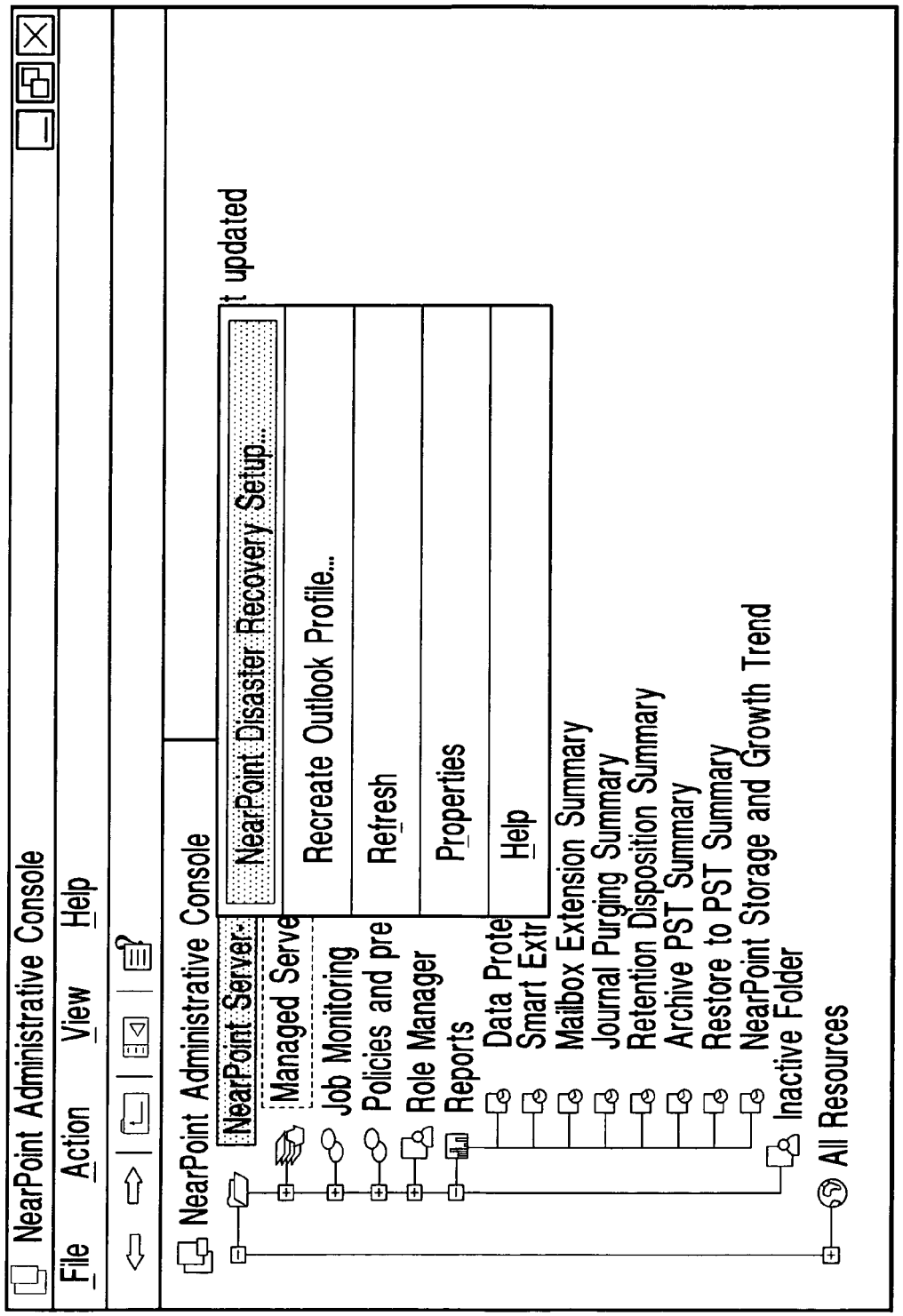
FIG. 12 is an example screenshot of selection of Near-Point™ Server Disaster Recovery (DR) setup, under an embodiment.

Disaster recovery setup begins using the NearPoint™ Administrator Console to establish the NearPoint™ server pair and begin replication. The administrator can "right-click" the NearPoint™ server and select "NearPoint™ Server Disaster Recovery Setup". FIG. 12 is an example screenshot of selection of NearPoint™ Server Disaster Recovery (DR) setup, under an embodiment.

Figure 13:
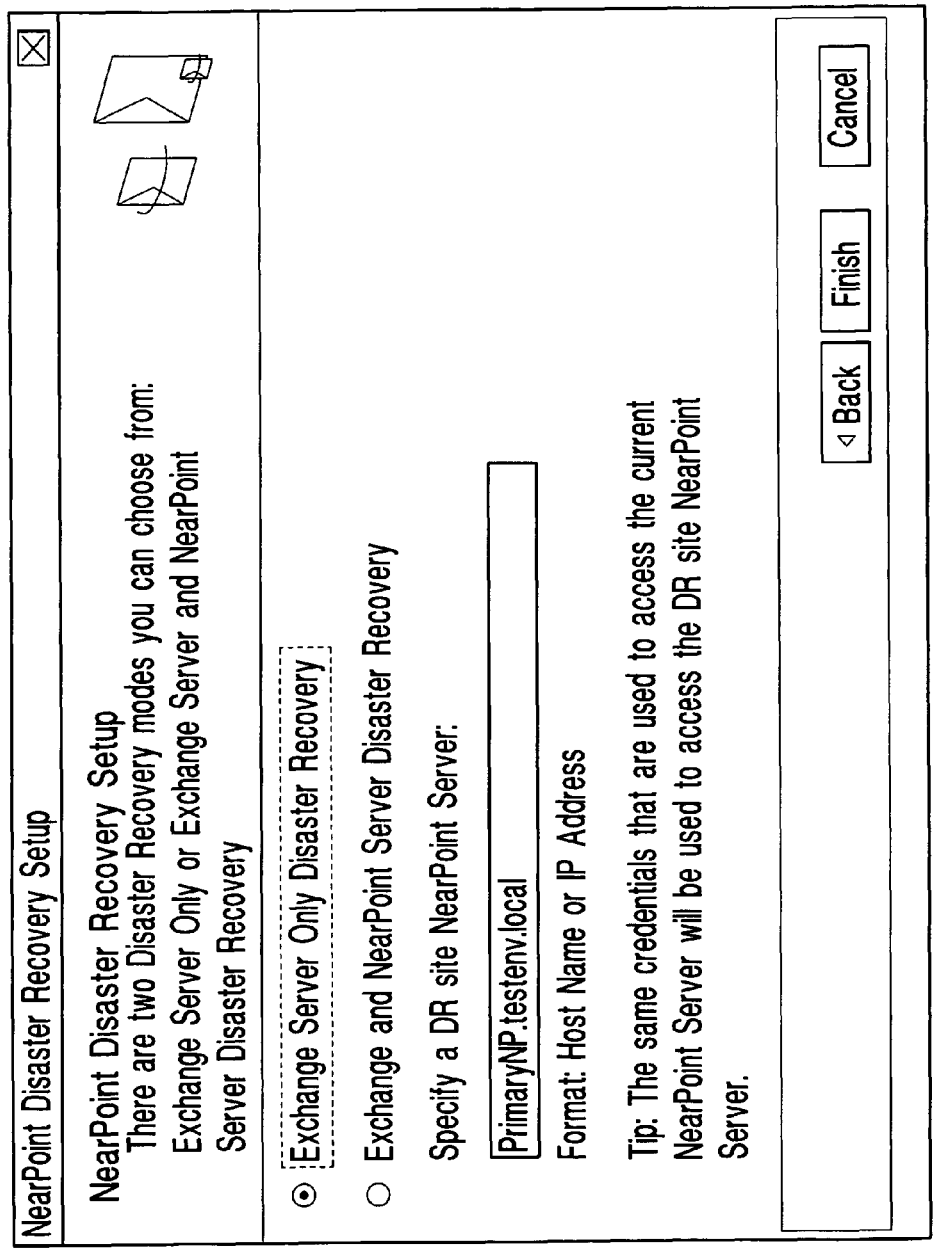
FIG. 13 is an example screenshot of NearPoint™ server name entry, under an embodiment.

The administrator then enters the name of the NearPoint™ server at the recovery site. FIG. 13 is an example screenshot of NearPoint™ server name entry, under an embodiment. The NearPoint™ server name is generally the name of the second NearPoint™ server located at the recovery site. If only one NearPoint™ Server is deployed, then its name is input. In this example, no replication services are deployed.

NearPoint™ performs a comparison of the two NearPoint™ servers to make sure their configurations match. A Check Report is issued confirming the test passed. FIG. 14 is an example NearPoint™ Check Report, under an embodiment. When the administrator selects "finish" the replication software begins its continuous protection of the NearPoint™ server. All the replication software settings are transparently managed by NearPoint™.

Figure 15:
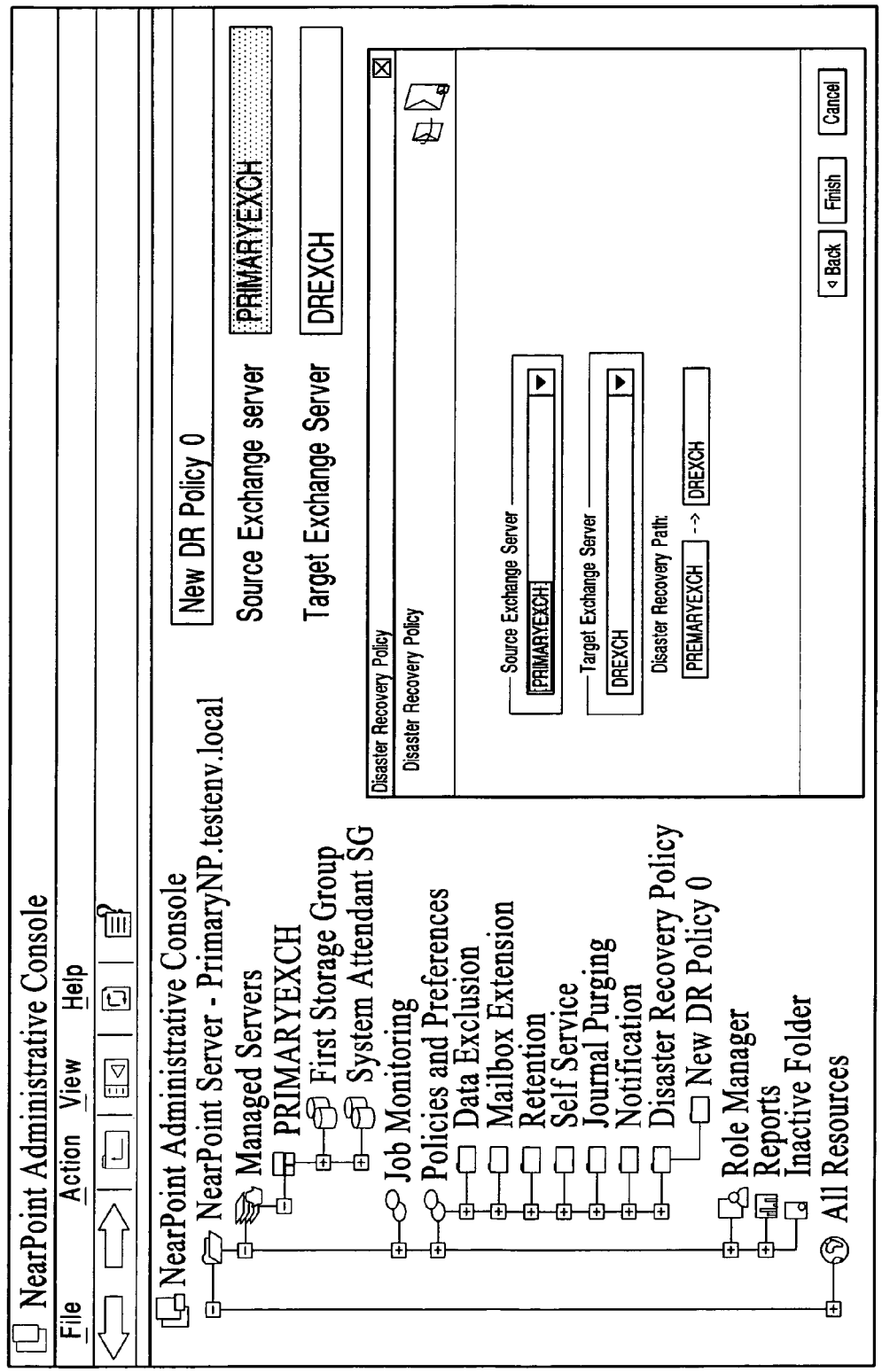
FIG. 15 is an example screenshot of Exchange Server recovery pair configuration using NearPoint™, under an embodiment.

The administrator continues setting up Exchange DR by configuring the Exchange Server recovery pair is configured. FIG. 15 is an example screenshot of Exchange Server recovery pair configuration, under an embodiment. In this screen, the name of the primary Exchange Server is input and the name of the standby Exchange Server is input. NearPoint™ automatically verifies that the standby server is configured correctly, checks for matching Storage Group and Mailbox Store names, and confirms that the Mailbox Stores are empty except for the default system mailboxes. The name of the standby server is not required to match the primary Exchange Server; this makes it possible to setup the standby server quickly without the requirement of managing two servers with the identical names in the same Domain.

When setup is complete, administrators monitor the replication services (if deployed) and the Exchange recovery pair using a status page on the NearPoint™ Administrator Console. In the event of a disaster, working on the NearPoint™ console, Administrators initiate full Exchange recovery as described below.

Figure 16:
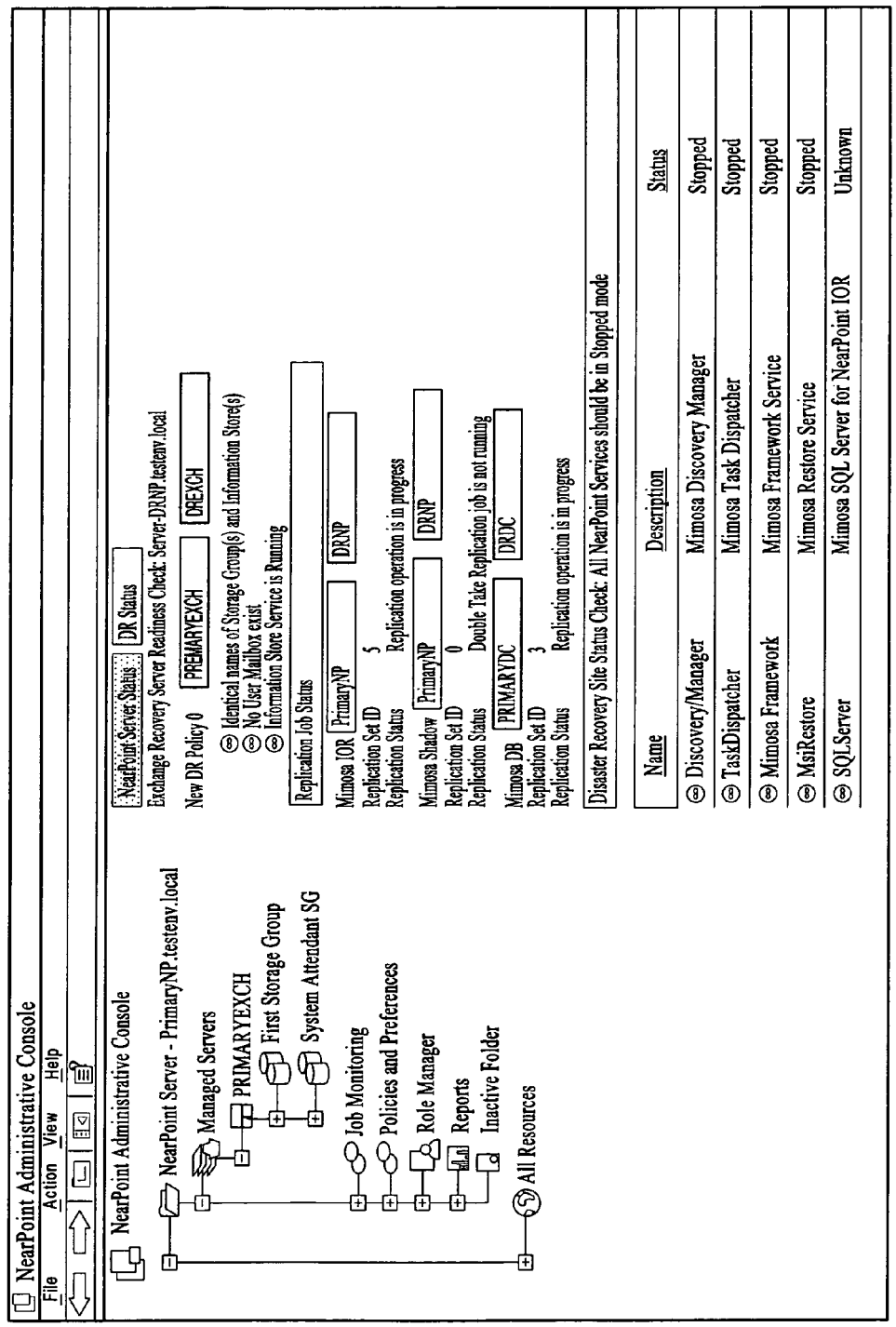
FIG. 16 is an example NearPoint™ DR Status page, under an embodiment.

The administrator uses the DR Status page to monitor the status of the DR configuration, including the NearPoint™ replication services and the Exchange recovery pair. FIG. 16 is an example of a NearPoint™ DR Status page, under an embodiment. The top portion of the page includes or lists the Exchange recovery pair and corresponding configuration status. Green lights indicate that the configuration is correct and ready for recovery. The middle or center portion of the page lists the replication operations and their status. The bottom portion of the page lists the DR NearPoint™ status.

Figure 17:
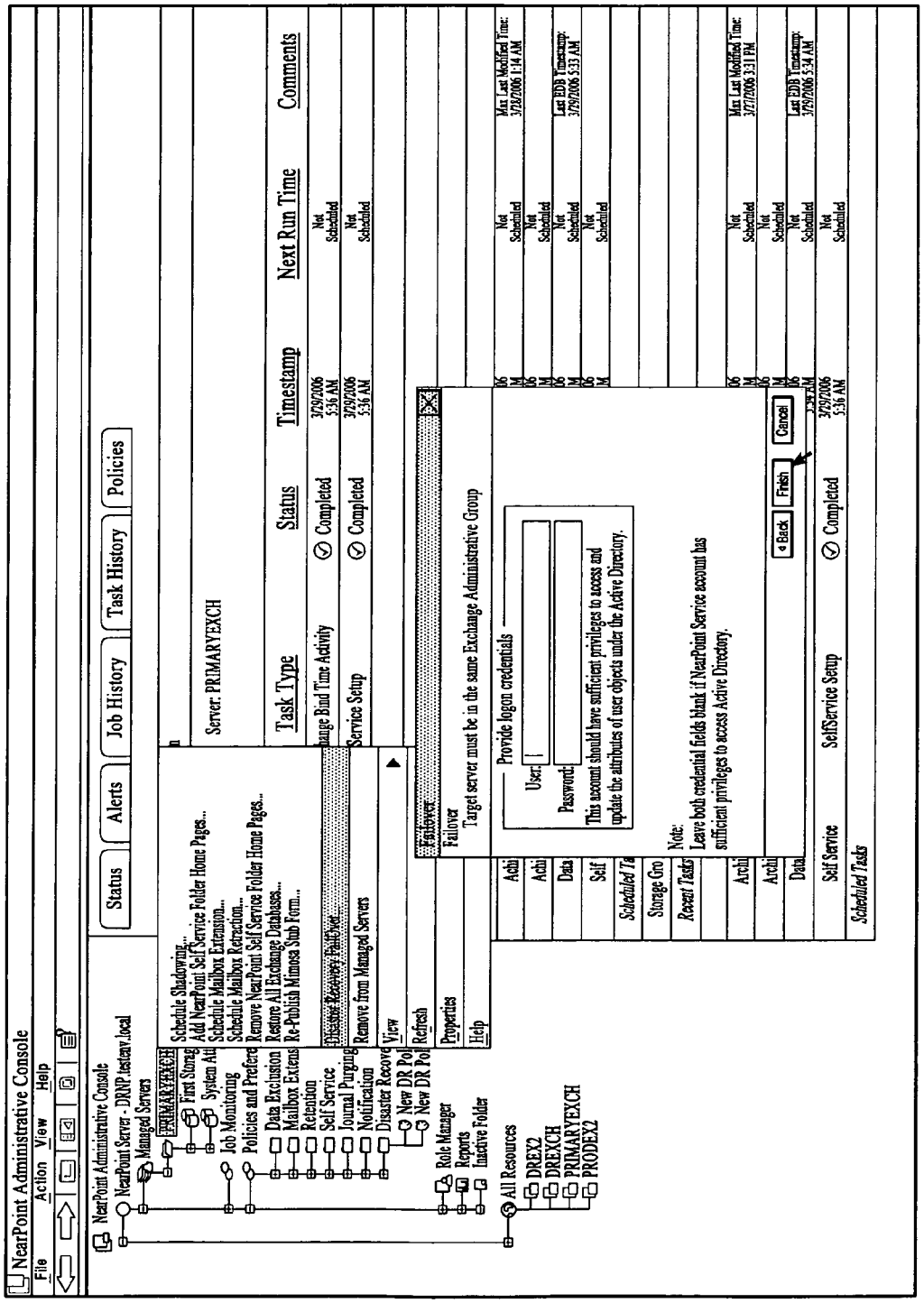
FIG. 17 is an example screenshot of selection of Disaster Recovery Failover using NearPoint™, under an embodiment.

If disaster strikes the primary Exchange Server, the administrator initiates Exchange recovery using the NearPoint™ Administrator Console. In the configuration with a replicated NearPoint™ server, the recovery includes use of the NearPoint™ server at the recovery site; otherwise the recovery includes use of the single NearPoint™ server. The administrator, after logging on to the NearPoint™ Administrator Console, initiates recovery of Exchange with a "right-click" of the Exchange Server and selects "Disaster Recovery Failover". FIG. 17 is an example screenshot of selection of Disaster Recovery Failover, under an embodiment.

Upon initiation of recovery by the administrator, NearPoint™ performs automatic recovery of all Exchange servers. The automatic recovery of an embodiment includes one or more of restoring Exchange databases, rebinding mailboxes in Active Directory, reconfiguring Exchange Server, re-homing Public Folder Store, identifying Exchange Roles and Services, cleaning up system mailboxes and removing duplicate items, and restarting Exchange Services. The recovery operations restore electronic mail service to end-users.

Figure 18:
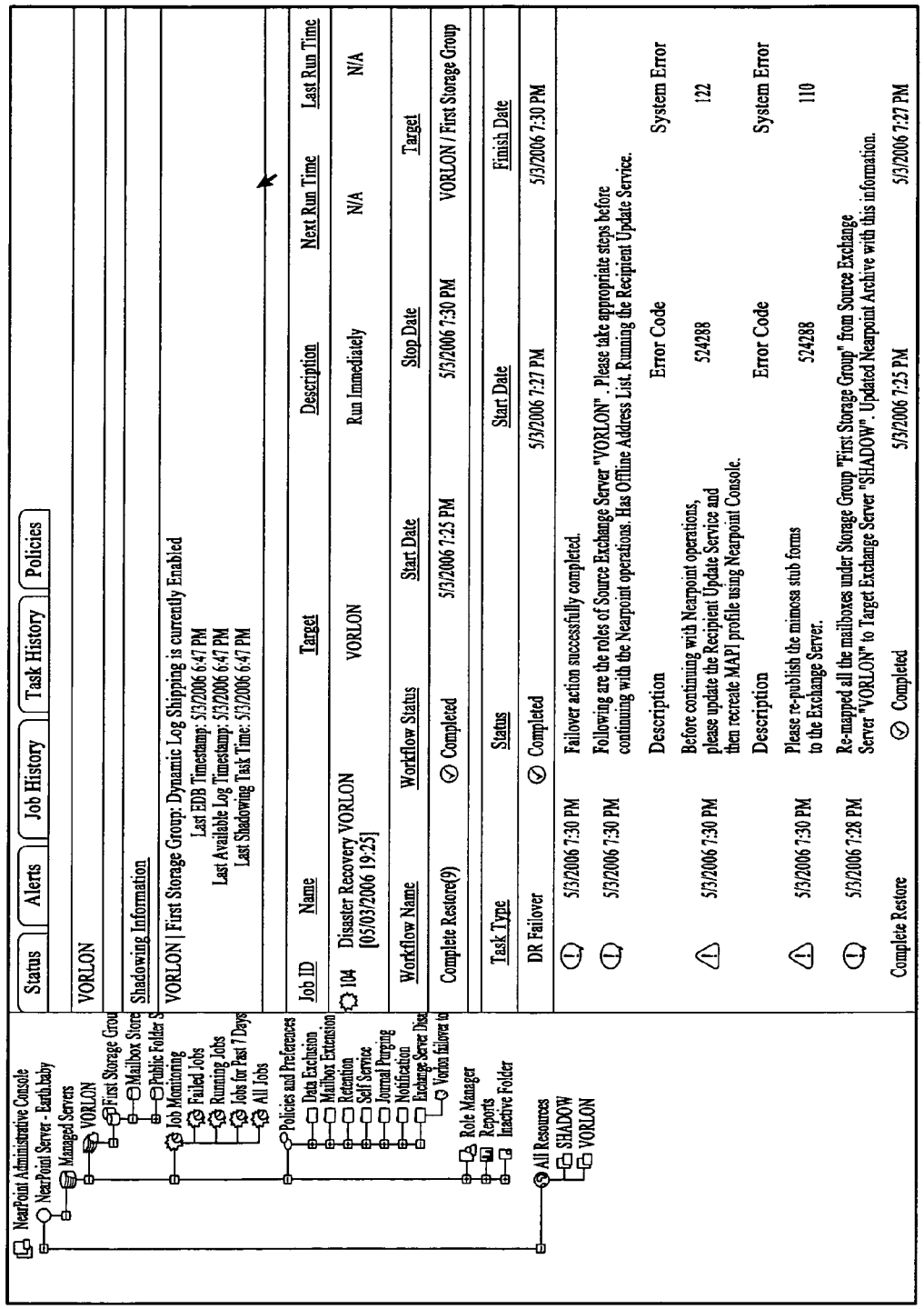
FIG. 18 is an example screenshot showing a NearPoint™ list of Exchange services that require cleaning, under an embodiment.

Any Exchange services that need to be cleaned up using Exchange Storage Manager are listed by NearPoint™ when recovery completes. FIG. 18 is an example screenshot showing the list of Exchange services that require cleaning, under an embodiment. Examples of Exchange services that require cleaning are Recipient Update Services and Offline Address Lists (Global Address) setup, both of which are site specific. Using the NearPoint™ Administrator Console, the administrator manages the new Exchange Server and begins data protection with a full shadow copy and log shipping. Exchange recovery is now complete and users have access to their mailboxes, containing all their electronic mail, running on the standby Exchange Server. They also continue to have access to all their archive electronic mail via Outlook and Outlook Web Access (OWA).

The SPS as described above provides a higher level of disaster recovery protection for enterprise services without the necessity of agent software installed on the enterprise servers. The SPS provides an automated disaster recovery solution that protects both data on the enterprise server as well as the archived data. The SPS continuously protects enterprise data locally while replicating the near-line server data continuously to a remote site. The recovery process of the SPS is automated and pre-configured to deliver fast, reliable results so that enterprise services are restored quickly and with minimal loss of data and minimal service disruption.

Traditional enterprise recovery solutions take a file or block based approach to replicating enterprise data based on their heredity as file system replication solutions. If corruption strikes an enterprise database, these solutions instantly replicate the corruption to the standby server rendering it corrupt. In contrast, the SPS is application intelligent in that it uses shadowing to always have a consistent copy of enterprise data ready for recovery, thereby preventing corrupted data from reaching the standby server.

Additionally, conventional enterprise recovery solutions are highly invasive to existing enterprise environments and require that kernel-level agents be installed to intercept byte-level changes. Kernel-level agents are typically not supported by enterprise servers and increase the risk of service interruption. In contrast to these conventional systems, the SPS performs on the near-line server and does not disrupt the enterprise environment with any agent software. Thus, existing enterprise environments remain unchanged, and all disaster protection is managed "off-host" on the near-line server.

Moreover, server recovery solutions have typically relied on manual steps and scripts which are time consuming, error prone and expensive to maintain. In contrast, the SPS offers a fully automated recovery solution for servers and sites. Using fully programmatic methods, system administrators can perform complete server and/or site recovery with "one-click" with the SPS of an embodiment. Therefore, system administrators can perform recovery more quickly and with more confidence knowing that the disaster recovery policies previously setup are pre-tested and ready to perform at a moments notice. The SPS can therefore substantially avoid the use of potentially very expensive array-based and unreliable host-based disaster recovery solutions that are very complex and costly to manage.

The SPS of an embodiment includes a method comprising continuously shadowing one or more live servers. The live servers of an embodiment include data that provides services to a plurality of clients. The method of an embodiment includes generating and maintaining a replica of the data during the shadowing. The method of an embodiment includes automatically restoring the services to the clients using one or more standby servers in response to a detected failure of the one or more live servers. The restoring of an embodiment includes copying the replica of the data to the standby server.

Each of the live servers and the standby servers of an embodiment is identified and addressed independently.

The replica of an embodiment includes one or more portions of the data of the live servers.

The replica of the data of an embodiment is stored on at least one near-line server during the shadowing. The replica of the data of an embodiment is copied to the standby server from the near-line server. The shadowing of an embodiment generates and maintains the replica of the data in near real-time on the near-line server. The shadowing of an embodiment maintains complete integrity and consistency of the data.

The at least one near-line server of an embodiment includes a near-line server co-located with the standby servers. The standby servers of an embodiment are located at a geographic location of the live servers. The standby servers of an embodiment are located at a different geographic location from the live servers.

The restoring of an embodiment includes preserving continuity of the services by automatically re-establishing access to the services by the clients.

The restoring of an embodiment includes restarting services corresponding to the data on the standby server.

The restoring of an embodiment includes rebinding mailboxes in a directory service to the standby server.

The restoring of an embodiment includes re-homing the clients.

The at least one near-line server of an embodiment includes a first near-line server co-located with the live servers at a first site and a second near-line server located at a second site. The replica of the data of an embodiment is stored on the first near-line server during the shadowing. The method of an embodiment includes replicating the replica from the first near-line server to the second near-line server. The replica of the data of an embodiment is copied to the standby server from the first near-line server. The replica of the data of an embodiment is copied to the standby server from the second near-line server.

The at least one near-line server of an embodiment includes a first near-line server co-located with the live servers at a first site and a second near-line server co-located with the standby servers at a second site. The replica of the data of an embodiment is stored on the first near-line server during the shadowing. The method of an embodiment includes replicating the replica from the first near-line server to the second near-line server. The replica of the data of an embodiment is copied to the standby server from the first near-line server. The replica of the data of an embodiment is copied to the standby server from the second near-line server.

The live servers of an embodiment include one or more messaging and collaboration servers. The data of an embodiment includes one or more of application data, databases, storage groups, mailbox data, and server data.

The live servers of an embodiment include Exchange Servers. Restoring the services to the clients of an embodiment includes rebinding mailboxes in Active Directory. Restoring the services to the clients of an embodiment includes identifying Exchange roles and services. Restoring the services to the clients of an embodiment includes re-homing Exchanges roles and services. Restoring the services to the clients of an embodiment includes re-homing Public Folder Stores. Restoring the services to the clients of an embodiment includes removing duplicate items from system mailboxes. Restoring the services to the clients of an embodiment includes restarting Exchange services. Restoring the services to the clients of an embodiment includes restoring Outlook services to the clients, wherein Outlook is an electronic mail and personal information management application. Restoring the services to the clients of an embodiment includes restoring signal stability routing protocol services to the clients.

Generating and maintaining the replica of an embodiment includes generating at least one data surrogate using information of the data and a plurality of data changes of the data received from the one or more live servers. The method of an embodiment includes updating the at least one data surrogate using information of at least one additional data change received from the one or more live servers. The updating of an embodiment is performed at least one of upon receipt of the at least one additional data change, subsequent to receipt of a plurality of additional data changes, and following processing operations on the at least one additional data change.

The one or more live servers of an embodiment include one or more of local servers, remote servers, database servers, messaging servers, electronic mail servers, instant messaging servers, voice-over Internet Protocol servers, collaboration servers, portals, customer relationship management (CRM) servers, enterprise resource planning (ERP) servers, business-to-business servers, and content management servers.

Generating and maintaining the replica of an embodiment includes host-based replication of the data on the standby servers.

Host-based replication of an embodiment includes writing data of the live servers to local storage of the live server. Host-based replication of an embodiment includes writing data of the live servers to remote storage of the standby server.

Automatically restoring the services of an embodiment includes a standby server assuming an identity and address of a live server that has failed.

Generating and maintaining the replica of an embodiment includes storage-based replication of the data on the standby servers. Storage-based replication of an embodiment includes writing data of the live servers to local storage of the live server. Storage-based replication of an embodiment includes replicating data of the local storage of the live server to remote storage of the standby server. Automatically restoring the services of an embodiment includes a standby server assuming an identity and address of a live server that has failed.

Generating and maintaining the replica of an embodiment includes writing data of the plurality of clients to components of a live server and to components of a standby server. Automatically restoring the services of an embodiment includes switching the clients from a failed live server to a standby server to which data was written.

The SPS of an embodiment includes a method comprising continuously shadowing one or more servers. The servers of an embodiment include application data that provides services to a plurality of clients. The method of an embodiment includes generating and maintaining a copy of the application data on at least one near-line server during the shadowing. The method of an embodiment includes restoring the services to the clients using one or more standby servers in response to a detected failure of the one or more servers. The restoring of an embodiment includes copying the copy of the application data from the near-line server to the standby server.

Each of the servers and the standby servers of an embodiment is identified and addressed independently.

The replica of an embodiment includes one or more portions of the data of one or more of the servers, the near-line server, and the standby servers.

The shadowing of an embodiment generates and maintains the replica of the data in near real-time on the near-line server. The shadowing of an embodiment maintains complete integrity and consistency of the data.

The restoring of an embodiment includes preserving continuity of the services by automatically re-establishing access to the services by the clients.

The restoring of an embodiment includes restarting services corresponding to the data on the standby server.

The restoring of an embodiment includes rebinding mailboxes in a directory service to the standby server.

The restoring of an embodiment includes re-homing the clients.

The servers of an embodiment include one or more messaging and collaboration servers.

The data of an embodiment includes one or more of application data, databases, storage groups, mailbox data, and server data.

The servers of an embodiment include Exchange Servers.

Generating and maintaining the replica of an embodiment includes generating at least one data surrogate using information of the data and a plurality of data changes of the data received from the one or more servers.

The method of an embodiment includes updating the at least one data surrogate using information of at least one additional data change received from the one or more servers.

The updating of an embodiment is performed at least one of upon receipt of the at least one additional data change, subsequent to receipt of a plurality of additional data changes, and following processing operations on the at least one additional data change.

The SPS of an embodiment includes a method comprising continuously shadowing one or more live servers. The live servers of an embodiment include data that provides services to a plurality of clients. The method of an embodiment includes generating and maintaining a replica of the data during the shadowing. The method of an embodiment includes automatically restoring the services to the clients in response to a detected failure of the one or more live servers. The restoring of an embodiment includes copying the replica of the data to the one or more live servers.

The SPS of an embodiment includes a computer readable medium including executable instructions which, when executed in a processing system, provide service preservation by continuously shadowing one or more servers, the servers including application data that provides services to a plurality of clients. The instructions of an embodiment, upon execution, generate and maintain a replica of the application data on at least one near-line server during the shadowing. The instructions of an embodiment, upon execution, automatically restore the services to the clients using one or more standby servers in response to a detected failure of the one or more servers, the restoring of services including copying the copy of the application data from the near-line server to the standby server.

Each of the servers and the standby servers of an embodiment is identified and addressed independently.

The replica of an embodiment includes one or more portions of the data of one or more of the servers, the near-line server, and the standby servers.

The shadowing of an embodiment generates and maintains the replica of the data in near real-time on the near-line server.

The shadowing of an embodiment maintains complete integrity and consistency of the data.

The restoring of an embodiment includes one or more of preserving continuity of the services by automatically re-establishing access to the services by the clients, restarting services corresponding to the data on the standby server, rebinding mailboxes in a directory service to the standby server, re-homing the clients.

Generating and maintaining the replica of an embodiment includes generating at least one data surrogate using information of the data and a plurality of data changes of the data received from the one or more servers.

The instructions of an embodiment, upon execution, update the at least one data surrogate using information of at least one additional data change received from the one or more servers, wherein the update is performed at least one of upon receipt of the at least one additional data change, subsequent to receipt of a plurality of additional data changes, and following processing operations on the at least one additional data change.

The SPS of an embodiment includes a system comprising one or more near-line servers coupled to one or more live servers that include data that provides services to a plurality of clients. The system of an embodiment includes an engine coupled to the near-line servers and configured to continuously shadow the live servers by generating and maintaining a replica of the data. The engine of an embodiment is configured to automatically restore the services to the clients using one or more standby servers in response to a detected failure of the one or more live servers. The restoring of an embodiment includes copying the replica of the data to the standby server.

The system of an embodiment includes at least one network coupled to the one or more near-line servers. The at least one network of an embodiment includes a local area network (LAN), wide area network (WAN), metropolitan area network (MAN), and storage area network (SAN).

Each of the live servers and the standby servers of the system of an embodiment is identified and addressed independently.

The shadowing of the system of an embodiment generates and maintains the replica of the data in near real-time on the one or more near-line servers, wherein the shadowing maintains complete integrity and consistency of the data.

The restoring of the system of the system of an embodiment includes the one or more near-line servers preserving continuity of the services by automatically re-establishing access to the services by the clients.

The restoring of the system of an embodiment includes the one or more near-line servers restarting services corresponding to the data on the standby server.

The restoring of the system of an embodiment includes the one or more near-line servers rebinding mailboxes in a directory service to the standby server.

The restoring of the system of an embodiment includes the one or more near-line servers re-homing the clients.

The at least one near-line server of the system of an embodiment includes a first near-line server co-located with the live servers at a first site and a second near-line server located at a second site. The replica of the data of the system of an embodiment includes is stored on the first near-line server during the shadowing, wherein the replica of the data is replicated from the first near-line server to the second near-line server. The replica of the data of the system of an embodiment includes is propagated to the standby server from the first near-line server. The replica of the data of the system of an embodiment includes is propagated to the standby server from the second near-line server.

The at least one near-line server of the system of an embodiment includes a first near-line server co-located with the live servers at a first site and a second near-line server co-located with the standby servers at a second site. The replica of the data of the system of an embodiment is stored on the first near-line server during the shadowing, wherein the replica of the data is replicated from the first near-line server to the second near-line server. The replica of the data of the system of an embodiment is copied to the standby server from the first near-line server. The replica of the data of the system of an embodiment is copied to the standby server from the second near-line server.

The data of the system of an embodiment includes one or more of application data, databases, storage groups, mailbox data, and server data.

The one or more live servers of the system of an embodiment include one or more of local servers, remote servers, database servers, messaging servers, electronic mail servers, instant messaging servers, Exchange Servers, voice-over Internet Protocol servers, collaboration servers, portals, customer relationship management (CRM) servers, enterprise resource planning (ERP) servers, business-to-business servers, and content management servers.

Generating and maintaining the replica of the system of an embodiment includes host-based replication of the data on the standby servers. The host-based replication of the system of an embodiment includes writing data of the live servers to local storage of the live server. The host-based replication of the system of an embodiment includes writing data of the live servers to remote storage of the standby server. Automatically restoring the services of the system of an embodiment includes a standby server assuming an identity and address of a live server that has failed. Generating and maintaining the replica of the system of an embodiment includes storage-based replication of the data on the standby servers. The storage-based replication of the system of an embodiment includes writing data of the live servers to local storage of the live server. The storage-based replication of the system of an embodiment includes replicating data of the local storage of the live server to remote storage of the standby server. Automatically restoring the services of the system of an embodiment includes a standby server assuming an identity and address of a live server that has failed.

The system of an embodiment includes at least one proxy coupled between the clients, the live servers, and the standby servers. Generating and maintaining the replica of the system of an embodiment includes the proxy writing data of the plurality of clients to components of at least one of the live servers and to components of at least one of the standby servers. Automatically restoring the services of the system of an embodiment includes the proxy switching the clients from a failed live server to a standby server to which data was written.

The SPS of an embodiment includes a computer readable medium including executable instructions which, when executed in a processing system, provide service preservation by continuously shadowing one or more live servers. The live servers of an embodiment include data that provides services to a plurality of clients. The providing of service preservation of an embodiment includes generating and maintaining a replica of the data during the shadowing. The providing of service preservation of an embodiment includes automatically restoring the services to the clients using one or more standby servers in response to a detected failure of the one or more live servers. The restoring of an embodiment includes copying the replica of the data to the standby server.

The SPS of an embodiment includes a method comprising continuously shadowing one or more live servers, the live servers including data that provides services to a plurality of clients. The method of an embodiment includes generating and maintaining a replica of the data during the shadowing. The method of an embodiment includes automatically transferring the replica of the data to one or more standby servers in response to an event of the one or more standby servers, wherein the event comprises a migration event that includes migration from a first version of at least one application hosted by the live servers to a second version of the application.

The method of an embodiment includes activating the standby servers hosting the replica of the data.

The method of an embodiment includes evaluating operation of the activated standby servers under the second version.

The method of an embodiment includes returning the activated standby servers to a standby state.

The method of an embodiment includes providing the services to the clients using the activated standby servers, wherein the activated standby servers are hosting the replica of the data. Providing the services to the clients with the activated standby servers of an embodiment comprises preserving continuity of the services by automatically re-establishing access to the services by the clients. Providing the services to the clients with the activated standby servers of an embodiment comprises restarting services corresponding to the data on the standby server. Providing the services to the clients with the activated standby servers of an embodiment comprises rebinding mailboxes in a directory service to the standby server. Providing the services to the clients with the activated standby servers of an embodiment comprises re-homing the clients. Providing the services to the clients of an embodiment includes using the one or more live servers.

Each of the live servers and the standby servers of an embodiment is identified and addressed independently.

The replica of an embodiment includes one or more portions of the data of the live servers.

The replica of the data of an embodiment is stored on at least one near-line server during the shadowing. The replica of the data of an embodiment is copied to the standby server from the near-line server. The shadowing of an embodiment generates and maintains the replica of the data in near real-time on the near-line server, wherein the shadowing maintains complete integrity and consistency of the data. The at least one near-line server of an embodiment includes a near-line server co-located with the standby servers. The standby servers of an embodiment are located at one or more of a geographic location of the live servers and a different geographic location from the live servers.

The at least one near-line server of an embodiment includes a first near-line server co-located with the live servers at a first site and a second near-line server located at a second site. The replica of the data of an embodiment is stored on the first near-line server during the shadowing. The method of an embodiment includes replicating the replica from the first near-line server to the second near-line server. The replica of the data of an embodiment is copied to the standby server from the first near-line server. The replica of the data of an embodiment is copied to the standby server from the second near-line server.

The at least one near-line server of an embodiment includes a first near-line server co-located with the live servers at a first site and a second near-line server co-located with the standby servers at a second site. The replica of the data of an embodiment is stored on the first near-line server during the shadowing. The method of an embodiment includes replicating the replica from the first near-line server to the second near-line server. The replica of the data of an embodiment is copied to the standby server from the first near-line server. The replica of the data of an embodiment is copied to the standby server from the second near-line server.

The live servers of an embodiment include one or more messaging and collaboration servers.

The data of an embodiment includes one or more of application data, databases, storage groups, mailbox data, and server data.

Generating and maintaining the replica of an embodiment includes generating at least one data surrogate using information of the data and a plurality of data changes of the data received from the one or more live servers. The method of an embodiment includes updating the at least one data surrogate using information of at least one additional data change received from the one or more live servers, wherein the updating is performed at least one of upon receipt of the at least one additional data change, subsequent to receipt of a plurality of additional data changes, and following processing operations on the at least one additional data change.

The one or more live servers of an embodiment include one or more of local servers, remote servers, database servers, messaging servers, electronic mail servers, instant messaging servers, voice-over Internet Protocol servers, collaboration servers, portals, customer relationship management (CRM) servers, enterprise resource planning (ERP) servers, business-to-business servers, and content management servers.

Generating and maintaining the replica of an embodiment includes one or more of host-based replication of the data on the standby servers and storage-based replication of the data on the standby servers. The host-based replication of an embodiment includes writing data of the live servers to local storage of the live server. The host-based replication of an embodiment includes writing data of the live servers to remote storage of the standby server. The storage-based replication of an embodiment includes writing data of the live servers to local storage of the live server. The storage-based replication of an embodiment includes replicating data of the local storage of the live server to remote storage of the standby server.

Generating and maintaining the replica of an embodiment includes writing data of the plurality of clients to components of a live server and to components of a standby server.

The first version of an embodiment is an original version of the application and the second version is a new version of the application.

The first version of an embodiment is a new version of the application and the second version is an original version of the application.

The SPS of an embodiment includes a method comprising continuously shadowing one or more live servers, the live servers including data that provides services to a plurality of clients. The method of an embodiment includes generating and maintaining a replica of the data during the shadowing. The method of an embodiment includes automatically propagating the replica of the data to one or more standby servers in response to an event of the one or more standby servers, wherein the event comprises one or more of a migration event and a drill event.

The migration event of an embodiment includes migration from a first version of at least one application hosted by the live servers to a second version of the application. The first version of an embodiment is an original version of the application and the second version is a new version of the application. The first version of an embodiment is a new version of the application and the second version is an original version of the application.

The drill event of an embodiment includes activating the standby servers hosting the replica of the data. The drill event of an embodiment includes evaluating operation of the activated standby servers. The method of an embodiment includes returning the activated standby servers to a standby state.

The method of an embodiment includes providing the services to the clients using the activated standby servers, wherein the activated standby servers are hosting the replica of the data. Providing the services to the clients with the activated standby servers of an embodiment includes preserving continuity of the services by automatically re-establishing access to the services by the clients. Providing the services to the clients with the activated standby servers of an embodiment includes one or more of restarting services corresponding to the data on the standby server, rebinding mailboxes in a directory service to the standby server, and re-homing the clients. The method of an embodiment includes providing the services to the clients using the one or more live servers.

Each of the live servers and the standby servers of an embodiment is identified and addressed independently.

The replica of an embodiment includes one or more portions of the data of the live servers.

The replica of the data of an embodiment is stored on at least one near-line server during the shadowing. The replica of the data of an embodiment is copied to the standby server from the near-line server. The shadowing of an embodiment generates and maintains the replica of the data in near real-time on the near-line server, wherein the shadowing maintains complete integrity and consistency of the data.

The at least one near-line server of an embodiment includes a first near-line server and a second near-line server. The method of an embodiment includes storing the replica of the data on the first near-line server during the shadowing and replicating the replica from the first near-line server to the second near-line server. The replica of the data of an embodiment is copied to the standby server from one or more of the first near-line server and the second near-line server.

Generating and maintaining the replica of an embodiment includes generating at least one data surrogate using information of the data and a plurality of data changes of the data received from the one or more live servers.

The SPS of an embodiment includes a computer readable medium including executable instructions which, when executed in a processing system, provides server version migration by continuously shadowing one or more live servers, the live servers including data that provides services to a plurality of clients. The instructions of an embodiment, when executed, generate and maintain a replica of the data during the shadowing. The instructions of an embodiment, when executed, automatically propagate the replica of the data to one or more standby servers in response to an event of the one or more standby servers. The event of an embodiment comprises one or more of a migration event and a drill event.

The SPS of an embodiment includes a system comprising one or more near-line servers coupled to one or more live servers that include data that provides services to a plurality of clients. The system of an embodiment includes an engine coupled to the near-line servers and configured to continuously shadow the live servers by generating and maintaining a replica of the data. The engine of an embodiment is configured to automatically transfer the replica of the data to one or more standby servers in response to an event of the one or more standby servers. The event of an embodiment comprises one or more of a migration event and a drill event.

The migration event of an embodiment includes migration from a first version of at least one application hosted by the live servers to a second version of the application.

The drill event of an embodiment includes activating the standby servers hosting the replica of the data. The drill event of an embodiment includes evaluating operation of the activated standby servers. The system of an embodiment includes returning the activated standby servers to a standby state.

The engine of an embodiment is configured to provide the services to the clients using the activated standby servers, wherein the activated standby servers are hosting the replica of the data. The engine of an embodiment is configured to preserve continuity of the services by automatically re-establishing access to the services by the clients with the activated standby servers. Providing the services to the clients with the activated standby servers of an embodiment comprises one or more of restarting services corresponding to the data on the standby server, rebinding mailboxes in a directory service to the standby server, and re-homing the clients. The engine of an embodiment is configured to also provide the services to the clients using the one or more live servers.

Each of the live servers and the standby servers of an embodiment is identified and addressed independently.

The system of an embodiment includes at least one network coupled to the one or more near-line servers and one or more live servers, wherein the at least one network includes one or more of a local area network (LAN), wide area network (WAN), metropolitan area network (MAN), and storage area network (SAN).

The engine of an embodiment is configured to shadow by generating and maintaining the replica of the data in near real-time on the one or more near-line servers, wherein the shadowing maintains complete integrity and consistency of the data.

The at least one near-line server of an embodiment includes a first near-line server co-located with the live servers at a first site and a second near-line server located at a second site. The replica of the data of an embodiment is stored on the first near-line server during the shadowing, wherein the replica of the data is replicated from the first near-line server to the second near-line server. The replica of the data of an embodiment is propagated to the standby server from one or more of the first near-line server and the second near-line server.

The at least one near-line server of an embodiment includes a first near-line server co-located with the live servers at a first site and a second near-line server co-located with the standby servers at a second site. The replica of the data of an embodiment is stored on the first near-line server during the shadowing, wherein the replica of the data is replicated from the first near-line server to the second near-line server. The replica of the data of an embodiment is copied to the standby server from one or more of the first near-line server and the second near-line server.

The data of an embodiment includes one or more of application data, databases, storage groups, mailbox data, and server data.

The one or more live servers of an embodiment include one or more of local servers, remote servers, database servers, messaging servers, electronic mail servers, instant messaging servers, Exchange Servers, voice-over Internet Protocol servers, collaboration servers, portals, customer relationship management (CRM) servers, enterprise resource planning (ERP) servers, business-to-business servers, and content management servers.

The SPS of an embodiment includes a system comprising one or more near-line servers coupled to one or more live servers that include data that provides services to a plurality of clients. The system of an embodiment includes an engine coupled to the near-line servers and configured to continuously shadow the live servers by generating and maintaining a replica of the data. The engine of an embodiment is configured to automatically transfer the replica of the data to one or more standby servers in response to an event of the one or more standby servers. The event of an embodiment comprises a migration event that includes migration from a first version of at least one application hosted by the live servers to a second version of the application.

The engine of an embodiment is configured to provide the services to the clients using the activated standby servers, wherein the activated standby servers are hosting the replica of the data. The engine of an embodiment is configured to preserve continuity of the services by automatically re-establishing access to the services by the clients with the activated standby servers. Providing the services to the clients with the activated standby servers of an embodiment comprises one or more of restarting services corresponding to the data on the standby server, rebinding mailboxes in a directory service to the standby server, and re-homing the clients. The engine of an embodiment is configured to also provide the services to the clients using the one or more live servers.

Each of the live servers and the standby servers of an embodiment is identified and addressed independently.

The engine of an embodiment is configured to shadow by generating and maintaining the replica of the data in near real-time on the one or more near-line servers, wherein the shadowing maintains complete integrity and consistency of the data.

The one or more live servers of an embodiment include one or more of local servers, remote servers, database servers, messaging servers, electronic mail servers, instant messaging servers, Exchange Servers, voice-over Internet Protocol servers, collaboration servers, portals, customer relationship management (CRM) servers, enterprise resource planning (ERP) servers, business-to-business servers, and content management servers.

Aspects of the SPS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the SPS include: microcontrollers with memory (such as electronically erasable programmable read-only memory (EEPROM)), embedded microprocessors, firmware, software, etc. Furthermore, aspects of the SPS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the SPS is not intended to be exhaustive or to limit the systems and methods described to the precise form disclosed. While specific embodiments of, and examples for, the SPS are described herein for illustrative purposes, various equivalent modifications are possible within the scope of other systems and methods for managing data, as those skilled in the relevant art will recognize. The teachings of the SPS provided herein can be applied to other processing systems and methods, not only for the systems and methods described above.

The elements and acts of the various embodiments described above can be combined to provide further embodiments. These and other changes can be made to the SPS in light of the above detailed description.

In general, in the following claims, the terms used should not be construed to limit the SPS to the specific embodiments disclosed in the specification and the claims, but should be construed to include all processing systems that operate under the claims. Accordingly, the SPS is not limited by the disclosure, but instead the scope of the SPS is to be determined entirely by the claims.

While certain aspects of the SPS are presented below in certain claim forms, the inventors contemplate the various aspects of the SPS in any number of claim forms. Accordingly, the inventors reserve the right to add additional claims after filing the application to pursue such additional claim forms for other aspects of the SPS.

What is claimed is:

1. A method comprising:
    continuously shadowing one or more live servers using at least one near-line server including a first near-line server by generating and maintaining a replica of data of the one or more live servers in an application consistent manner, wherein the generating and maintaining comprises generating write-ahead logs by the one or more live servers and receiving the write-ahead logs by the at least one near-line server, the at least one near-line server updating the replica by applying the write-ahead logs to the replica, the one or more live servers including data that provides services to a plurality of clients;

storing the replica of the data using the at least one near-line server in communication with the one or more live servers; and automatically restoring the services to the clients using one or more standby servers in communication with the at least one near-line server in response to a detected failure of the one or more live servers, the restoring including copying the replica of the data to the one or more standby servers, the at least one near-line server to provide data access to at least one of the one or more live servers and the one or more standby servers as part of a restore operation in continuing to provide the services to the plurality of clients.

2. The method of claim 1, wherein each of the one or more live servers and the one or more standby servers is identified and addressed independently.

3. The method of claim 1, wherein the replica includes one or more portions of the data.

4. The method of claim 1, wherein the replica of the data is stored on the at least one near-line server during the shadowing.

5. The method of claim 4, wherein the replica of the data is copied to the one or more standby servers from the at least one near-line server.

6. The method of claim 4, wherein the shadowing generates and maintains the replica of the data in near real-time on the at least one near-line server, wherein the shadowing maintains complete integrity and consistency of the data.

7. The method of claim 4, wherein the at least one near-line server includes a near-line server co-located with the one or more standby servers.

8. The method of claim 7, wherein the one or more standby servers are located at a geographic location of the one or more live servers.

9. The method of claim 7, wherein the one or more standby servers are located at a different geographic location from the one or more live servers.

10. The method of claim 1, wherein the restoring includes preserving continuity of the services by automatically re-establishing access to the services by the clients.

11. The method of claim 1, wherein the restoring includes restarting services corresponding to the data on the one or more standby servers.

12. The method of claim 1, wherein the restoring includes rebinding mailboxes in a directory service to the one or more standby servers.

13. The method of claim 1, wherein the restoring includes re-homing the clients.

14. The method of claim 1, wherein the at least one near-line server includes a first near-line server co-located with the one or more live servers at a first site and a second near-line server located at a second site.

15. The method of claim 14, wherein the replica of the data is stored on the first near-line server during the shadowing.

16. The method of claim 15, further comprising replicating the replica from the first near-line server to the second near-line server.

17. The method of claim 16, wherein the replica of the data is copied to the one or more standby servers from the first near-line server.

18. The method of claim 16, wherein the replica of the data is copied to the one or more standby servers from the second near-line server.

19. The method of claim 1, wherein the at least one near-line server includes the first near-line server and the second near-line server.

20. The method of claim 19, wherein the replica of the data is stored on the first near-line server during the shadowing.

21. The method of claim 20, further comprising replicating the replica from the first near-line server to the second near-line server.

22. The method of claim 21, wherein the replica of the data is copied to the one or more standby servers from the first near-line server.

23. The method of claim 21, wherein the replica of the data is copied to the one or more standby servers from the second near-line server.

24. The method of claim 1, wherein the one or more live servers include one or more messaging and collaboration servers.

25. The method of claim 24, wherein the data includes one or more of application data, databases, storage groups, mailbox data, and server data.

26. The method of claim 1, wherein the one or more live servers include Exchange Servers.

27. The method of claim 26, wherein restoring the services to the clients includes rebinding mailboxes in Active Directory.

28. The method of claim 26, wherein restoring the services to the clients includes identifying Exchange roles and services.

29. The method of claim 26, wherein restoring the services to the clients includes re-homing Exchanges roles and services.

30. The method of claim 26, wherein restoring the services to the clients includes re-homing Public Folder Stores.

31. The method of claim 26, wherein restoring the services to the clients includes removing duplicate items from system mailboxes.

32. The method of claim 26, wherein restoring the services to the clients includes restarting Exchange services.

33. The method of claim 26, wherein restoring the services to the clients includes restoring Outlook services to the clients, wherein Outlook is an electronic mail and personal information management application.

34. The method of claim 26, wherein restoring the services to the clients includes restoring signal stability routing protocol services to the clients.

35. The method of claim 1, wherein generating and maintaining the replica includes generating at least one data surrogate using information of the data and a plurality of data changes of the data received from the one or more live servers.

36. The method of claim 35, further comprising updating the at least one data surrogate using information of at least one additional data change received from the one or more live servers.

37. The method of claim 36, wherein the updating is performed at least one of upon receipt of the at least one additional data change, subsequent to receipt of a plurality of additional data changes, and following processing operations on the at least one additional data change.

38. The method of claim 1, wherein the one or more live servers include one or more of local servers, remote servers, database servers, messaging servers, electronic mail servers, instant messaging servers, voice-over Internet Protocol servers, collaboration servers, portals, customer relationship management (CRM) servers, enterprise resource planning (ERP) servers, business-to-business servers, and content management servers.

39. The method of claim 1, wherein generating and maintaining the replica includes host-based replication of the data on the one or more standby servers.

40. The method of claim 39, wherein host-based replication comprises:
   writing data of the one or more live servers to local storage of the one or more live servers; and
   writing data of the one or more live servers to remote storage of the one or more standby servers.

41. The method of claim 40, wherein automatically restoring the services includes a standby server assuming an identity and address of a live server that has failed.

42. The method of claim 1, wherein generating and maintaining the replica includes storage-based replication of the data on the one or more standby servers.

43. The method of claim 42, wherein storage-based replication comprises
   writing data of the one or more live servers to local storage of the one or more live servers; and
   replicating data of the local storage of the one or more live servers to remote storage of the one or more standby servers.

44. The method of claim 43, wherein automatically restoring the services includes a standby server assuming an identity and address of a live server that has failed.

45. The method of claim 1, wherein generating and maintaining the replica includes writing data of the plurality of clients to components of a live server and to components of a standby server.

46. The method of claim 45, wherein automatically restoring the services includes switching the clients from a failed live server to a standby server to which data was written.

47. Computer readable medium including executable instructions which, when executed in a processing system, perform service preservation by:
   continuously shadowing one or more live servers using at least one near-line server including a first near-line server by generating and maintaining a replica of data of the one or more live servers in an application consistent manner, wherein the generating and maintaining comprises generating write-ahead logs by the one or more live servers and receiving the write-ahead logs by the at least one near-line server, the at least one near-line server updating the replica by applying the write-ahead logs to the replica, the one or more live servers including data that provides services to a plurality of clients;
   storing the replica of the data using the at least one near-line server in communication with the one or more live servers; and
   automatically restoring the services to the clients using one or more standby servers in communication with the at least one near-line server in response to a detected failure of the one or more live servers, the restoring including copying the replica of the data to the one or more standby servers, the at least one near-line server to provide data access to at least one of the one or more live servers and the one or more standby servers as part of a restore operation in continuing to provide the services to the plurality of clients.

* * * * *